United States Patent
Walsh et al.

(10) Patent No.: US 12,282,796 B1
(45) Date of Patent: Apr. 22, 2025

(54) APPARATUS AND METHOD FOR PERFORMING GROUP COMPUTING IN A SAFETY-CRITICAL OPERATING ENVIRONMENT (SCOE)

(71) Applicant: Parry Labs, LLC, Alexandria, VA (US)

(72) Inventors: David Walsh, Alexandria, VA (US); Charles Adams, Cedar Rapids, IA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/910,794

(22) Filed: Oct. 9, 2024

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 8,078,824 B2 * | 12/2011 | Sugumar | ............... | G06F 9/5088 711/170 |
| 8,977,848 B1 * | 3/2015 | Tomlinson | ............... | G06F 21/57 713/166 |
| 9,411,674 B2 * | 8/2016 | Pattabiraman | ........ | G06F 1/3275 |
| 10,891,234 B2 * | 1/2021 | Noll | .................... | G06F 12/0864 |
| 11,237,866 B2 * | 2/2022 | Bahramshahry | ...... | G06F 9/5016 |
| 12,147,823 B1 * | 11/2024 | Walsh | ................... | G06F 16/164 |

OTHER PUBLICATIONS

Perez-Cerrolaza et al "GPU Devices for Safety-Critical Systems: A Survey", 2022 ACM, 37 pages.*
Rodrigues et al "Approximate Computing for Safety-Critical Applications", 2021 IEEE, 3 pages.*
Paulitsch et al "Mixed-Criticality Embedded Systems—A Balance Ensuring Partitioning and Performance", 2015 IEEE, pp. 453-461.*
Addy "A Case Study on Isolation of Safety-Critical Software", 1991 IEEE, pp. 75-83.*

* cited by examiner

*Primary Examiner* — Van H Nguyen
(74) *Attorney, Agent, or Firm* — Caldwell Intellectual Property Law

(57) ABSTRACT

Apparatus for performing group computing in a safety-critical operating environment (SCOE) includes a primary computing device, wherein the primary computing device includes a processor and a memory communicatively connected to the processor. The memory contains instructions configuring the processor to receive task data, determine a group computing need by comparing the task data against a preset group computing criterion, determine a hardware allocation as a function of the group computing need, create a virtual environment using a secondary computing device communicatively connected to the primary computing device, as a function of the hardware allocation, allocate at least a portion of the task data to the at least a secondary computing device, as a function of the group computing need, wherein the at least a portion of the task data is executed by the secondary computing device, and receive from the at least a secondary computing device a processing result.

20 Claims, 9 Drawing Sheets

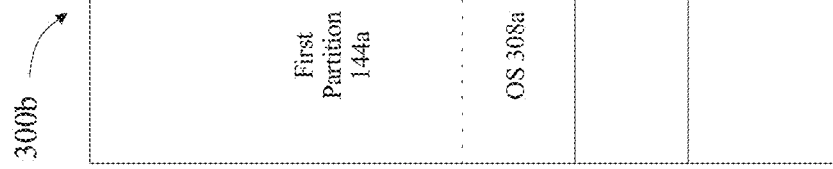
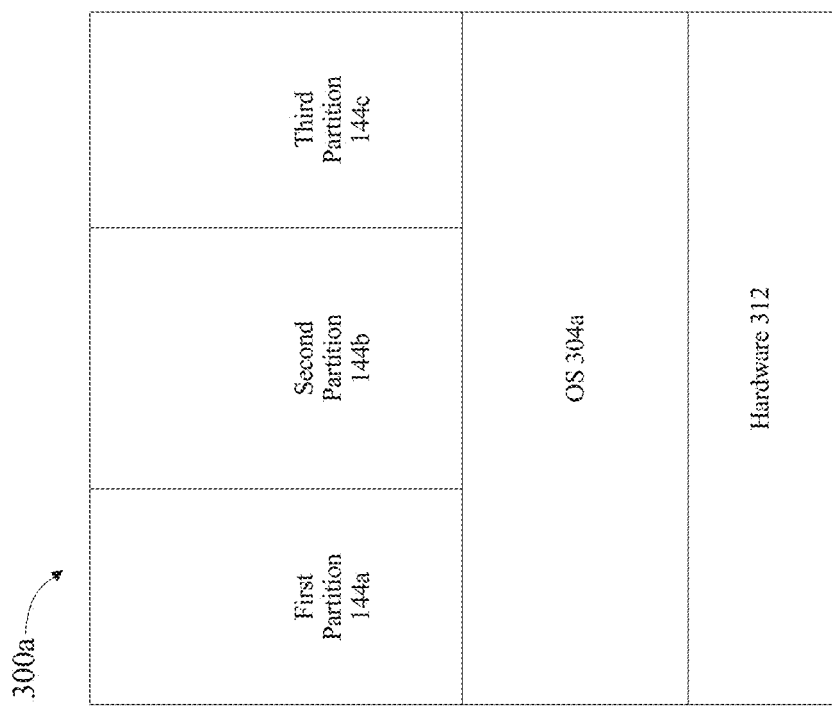
FIG. 3B
FIG. 3A

APPARATUS AND METHOD FOR PERFORMING GROUP COMPUTING IN A SAFETY-CRITICAL OPERATING ENVIRONMENT (SCOE)

FIELD OF THE INVENTION

The present invention generally relates to the field of group computing. In particular, the present invention is directed to apparatus and methods for performing group computing in a safety-critical operating environment (SCOE).

BACKGROUND

Group computing, also known as distributed computing or collaborative computing, utilizes multiple computing devices working together to solve an often-complex problem or task. Instead of one computer or a few computers doing all the work, group computing breaks down a task into smaller parts to be processed simultaneously, often over a network, and each computing device in the group may only be responsible for handling a portion of the task. The computing devices may then combine their solutions with respect to their assigned portions to complete the task. Compared to traditional computing that occurs on a single computing device or a limited set of computing devices, group computing may offer several advantages, such as without limitation a higher speed and efficiency of computation, a more desirable scalability, a superior cost-effectiveness, a higher fault tolerance, and/or a more strategic utilization of computational resources. Group computing, however, is often plagued by concerns such as data leakage, insecure communications, and an increased attack surface, among others. However, certain computing tasks in applications such as avionics require a safety-critical operating environment and therefore demand not only robust computational capabilities but also stringent adherence to safety standards. Such requirements potentially hinder the use of group computing in these applications.

SUMMARY OF THE DISCLOSURE

In an aspect, an apparatus for performing group computing in a safety-critical operating environment (SCOE) is described. The apparatus includes a primary computing device, wherein the primary computing device includes at least a processor, and a memory communicatively connected to the at least a processor. The memory contains instructions configuring the at least a processor to receive task data. The at least a processor is further configured to determine a group computing need, wherein determining the group computing need includes comparing the task data against a preset group computing criterion and determining the group computing need as a function of the comparison. The at least a processor is further configured to determine a hardware allocation as a function of the group computing need. The at least a processor is further configured to create a virtual environment using at least a secondary computing device communicatively connected to the primary computing device, as a function of the hardware allocation. The at least a processor is further configured to allocate at least a portion of the task data to the at least a secondary computing device, as a function of the group computing need, wherein the at least a portion of the task data is executed by the at least a secondary computing device. The at least a processor is further configured to receive from the at least a secondary computing device a processing result.

In another aspect, a method for performing group computing in a safety-critical operating environment (SCOE) is described. The method includes receiving, by at least a processor of a primary computing device, task data. The method further includes determining, by the at least a processor, a group computing need, wherein determining the group computing need includes comparing the task data against a preset group computing criterion and determining the group computing need as a function of the comparison. The method further includes determining, by the at least a processor, a hardware allocation as a function of the group computing need. The method further includes creating, by the at least a processor, a virtual environment using at least a secondary computing device communicatively connected to the primary computing device, as a function of the hardware allocation. The method further includes allocating, by the at least a processor, at least a portion of the task data to the at least a secondary computing device, as a function of the group computing need, wherein the at least a portion of the task data is executed by the at least a secondary computing device. The method further includes receiving, by the at least a processor from the at least a secondary computing device, a processing result.

These and other aspects and features of nonlimiting embodiments of the present invention will become apparent to those skilled in the art upon review of the following description of specific nonlimiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 3A-B are block diagrams illustrating exemplary partitioning designs pertaining to the apparatus in FIG. 1;

Figure 1:
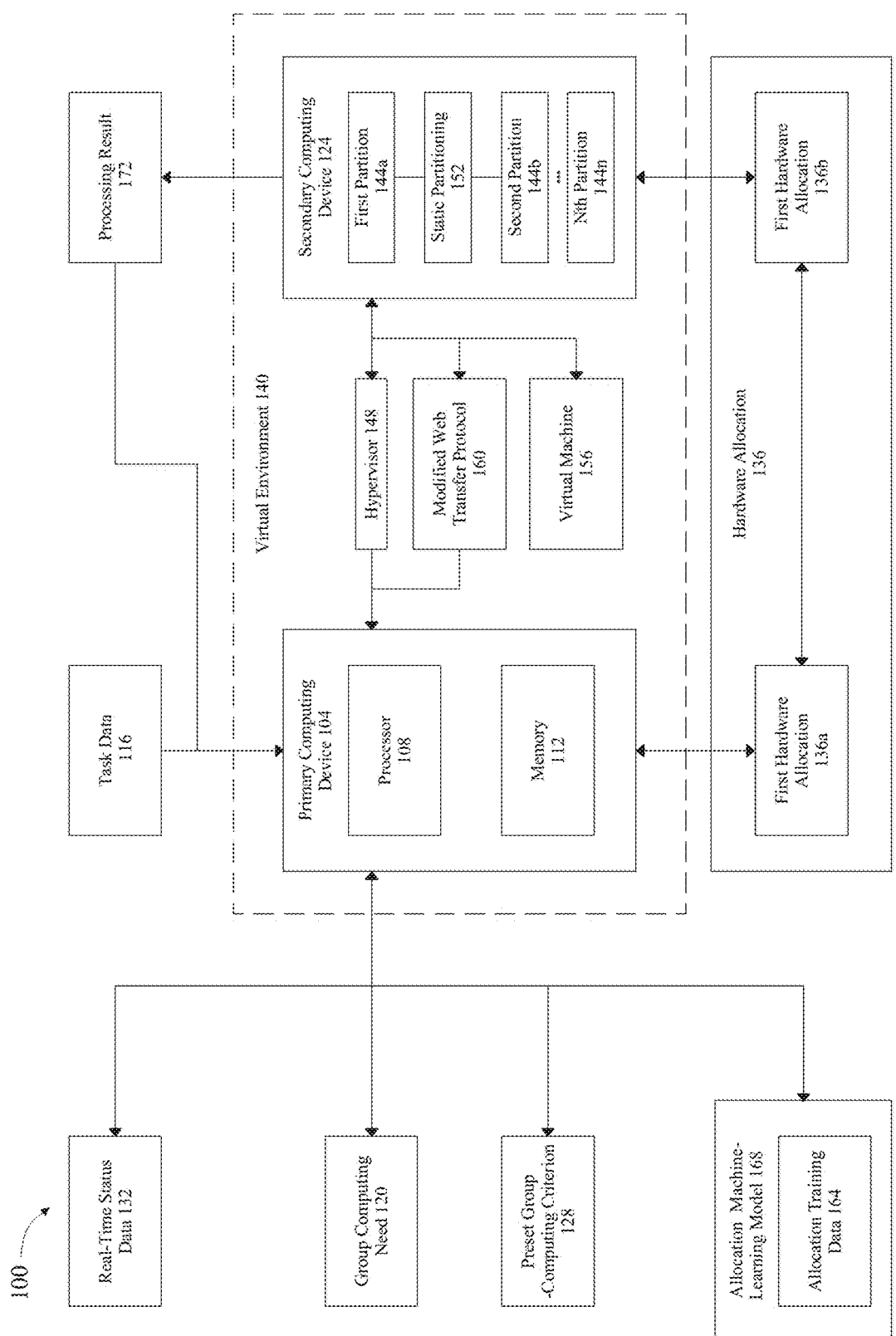
FIG. 1 is an exemplary embodiment of an apparatus that performing group computing in a safety-critical operating environment (SCOE)

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for performing group computing in a safety-critical operating environment (SCOE). The apparatus includes a primary computing device, wherein the primary computing device includes at least a processor and a memory communicatively connected to the at least a processor. The memory contains instructions configuring the at least a processor to receive task data. In one or more embodiments, the task data may include at least a configuration request that determines an initial allocation of the task data. The at least a processor is further configured to determine a group computing need. Determining the group computing need includes comparing the task data against a preset group computing criterion and determining the group computing need as a function of the comparison. In one or more embodiments, the at least a processor may be further configured to receive real-time status data. Accordingly, the at least a processor may adjust the group computing need as a function of the real-time status data.

The at least a processor may be further configured to determine a hardware allocation as a function of the group computing need. In one or more embodiments, determining the hardware allocation may include determining a first hardware allocation within the primary computing device and determining at least a second hardware allocation within at least a secondary computing device communicatively connected to the primary computing device. The first hardware allocation and the at least a second hardware allocation may then be combined as the hardware allocation.

The at least a processor may be further configured to create a virtual environment using the at least a secondary computing device, as a function of the hardware allocation. In one or more embodiments, the virtual environment may include a first partition and at least a second partition. In one or more embodiments, the virtual environment may further include at least a hypervisor configured to deploy a static partitioning that isolates the first partition from the at least a second partition. In some cases, the at least a hypervisor may be configured to deploy at least a virtual machine as a function of the static partitioning. In one or more embodiments, the at least a processor may be further configured to receive supplemental task data and adjust connections between the first partition and the at least a second partition within the virtual environment, as a function of the supplemental task data. In one or more embodiments, the at least a processor may be further configured to integrate at least a software module into the virtual environment.

The at least a processor is further configured to allocate at least a portion of the task data to at least a secondary computing device, as a function of the group computing need. The at least a portion of the task data is executed by the at least a secondary computing device. In one or more embodiments, allocating the at least a portion of the task data may include allocating the at least a portion of the task data using a modified web transfer protocol. In one or more embodiments, the at least a processor may subsequently modify an allocation of the task data between the primary computing device and the at least a secondary computing device, as a function of an adjusted group computing need. In some cases, modifying the allocation of the task data may involve using a machine-learning model. Specifically, modifying the allocation of the task data may include receiving allocation training data including a plurality of exemplary allocations as outputs correlated to a plurality of exemplary group computing needs as inputs. The allocation training data may be used to train an allocation machine-learning model. Subsequently, the at least a processor may modify the allocation of the task data as a function of the trained allocation machine-learning model.

The at least a processor is further configured to receive from the at least a secondary computing device a processing result.

Aspects of the present disclosure may be used in a group computing environment to ensure compliance of software applications with stringent safety and security standards, such as those found in various avionics. Aspects of the present disclosure may also be used to optimize resource allocation in a group computing environment, such as without limitation memory and processing power. Aspects of the present disclosure may improve the scalability and adaptability of group computing in response to changing operational requirements. Exemplary embodiments illustrating aspects of the present disclosure are described below in the context of several specific examples.

Referring now to FIG. 1, an apparatus 100 for performing group computing in a safety-critical operating environment (SCOE) is illustrated. For the purposes of this disclosure, a "safety-critical operating environment (SCOE)" is a system, application, or context thereof in which the proper and error-free operation is vital to ensure the safety of both user and property. Failures, malfunctions, and/or unintended behaviors in such environments may lead to severe harm or consequences, such as without limitation injury, loss of life, environmental damage, and/or destruction of property. Therefore, these environments demand extremely high reliability, fault tolerance, and strict regulatory oversight to minimize the risk of failure. As nonlimiting examples, an SCOE may be applied to medical devices such as without limitation pacemakers or ventilators, aviation systems such as without limitation air traffic control or autopilot systems, industrial automations such as without limitation nuclear plants or chemical factories, among others. The use of SCOE may be especially crucial in aviation systems, such as flight control system, air traffic control system, and/or any other avionic components within an aircraft or broader aviation infrastructure, where correct operation is imperative to ensure the safety of the flight, passengers, crew, and others on the ground. An air vehicle system may contain a myriad of subsystems categorized as "avionics" (i.e., electronics in the air composed of hardware, software, and/or firmware, or a combination thereof) that are a mix of Government Furnish Equipment (GFE) and Contractor Furnished Equipment (CFE), wherein each avionics subsystem within the mission system may include one or more application software (each containing millions of lines of software source code) that perform certain functions, some of which have been determined to be safety critical by the required and/or independent army authority.

With continued reference to FIG. 1, an SCOE may be contrasted with a mission-critical operating environment (MCOE). For the purposes of this disclosure, a "mission-critical operating environment (MCOE)" is a system or process where the success or failure of the system is essential to the achievement of a specific mission or task. While failure in a mission-critical system may result in severe operational disruption or financial loss, it may not directly result in loss of life or physical harm. As nonlimiting examples, an MCOE may be applied to banking systems, Telecommunication networks, data centers in a business context, among others.

With continued reference to FIG. 1, apparatus 100 includes a primary computing device 104. Primary computing device 104 includes at least a processor 108. Primary computing device 104 may include or be implemented using any type of computing device deemed suitable by a person of ordinary skill in the art, upon reviewing the entirety of this disclosure. Computing device may include any analog or digital control circuit, including without limitation an operational amplifier circuit, a combinational logic circuit, a sequential logic circuit, an application-specific integrated circuit (ASIC), a field programmable gate arrays (FPGA), and/or the like. Computing device may include any computing device as described in this disclosure, including without limitation a microcontroller, microprocessor, digital signal processor, and/or system on a chip as described in this disclosure. Computing device may include, be included in, and/or communicate with a mobile device such as a mobile telephone, smartphone, or tablet. Computing device may include a single computing device operating independently, or may include two or more computing device operating in concert, in parallel, sequentially, or the like; two or more computing devices may be included together in a single computing device or in two or more computing devices. In some cases, primary computing device 104 and/or at least a processor 108 may implement a network-on-chip design. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card, or the like), a modem, and/or any combination thereof. Examples of a network may include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a first computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a nonlimiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. A person of ordinary skill in the art, upon reviewing the entirety of this disclosure, will be aware of various ways in which steps, sequences of steps, processing tasks, and/or data may be subdivided, shared, or otherwise dealt with using iteration, recursion, and/or parallel processing. More details regarding computing devices will be described below.

With continued reference to FIG. 1, apparatus 100 includes a memory 112. For the purposes of this disclosure, a "memory" is a device used to store programs or data on a temporary or permanent basis for use in a computing device. In some cases, memory 112 may include a space for data to be read or written. As a nonlimiting example, memory 112 may include a random access memory (RAM). In some cases, RAM may include a dynamic RAM (DRAM) that stores each bit of data in a separate capacitor within a computing device and being constantly refreshed to maintain the data. In some other cases, RAM may include a static RAM (SRAM) that uses one or more flip-flops to store data (i.e., no need for refreshing). SRAM is capable of retaining stored data as long as power is supplied to it. In one or more embodiments, memory 112 may be read only (i.e., read-only memory or ROM). Data that is stored in ROM may be hard-wired and may not be easily altered or re-written. In some cases, memory may retain data even after the power of a computing device is turned off. However, in some cases, data within memory 112 may be wiped and/or removed after a computing device has been turned off and/or the use of a particular software has been terminated. In some cases, memory 112 may be programmable. In some cases, a user may erase memory 112 (such as without limitation UV light) and reprogram the memory 112. In some cases, memory 112 may include a flash memory e.g., a USB drive, a memory card, a solid-state drive (SSD), and/or the like. In some cases, memory 112 may include cache memory, wherein at least a processor 108 may store data used most often in the cache memory, thereby making it instantly available to speed up the at least a processor 108. For the purposes of this disclosure, a "cache" is a smaller, faster memory storage component that temporarily stores copies of frequently accessed data from a larger, slower memory source. The memory source may include without limitation a main memory or a hard drive. The purpose of a cache is to speed up data retrieval and improve overall system performance by reducing the time it takes for a processor to access data. Other exemplary embodiments of memory 112 may include without limitation magnetic memory (e.g., hard disk drive [HDD]), optical memory, magnetic tape memory, phase-change memory (PCM), ferroelectric RAM (FeRAM or FRAM), and/or the like. In some cases, a computing device may include one or more computing units dedicated to data storage, security, distribution of traffic for load balancing, and/or the like. As a nonlimiting example, memory 112 may include a secondary memory, such as an HDD, configured to be a long-term storage device in which an operating system and/or other information is stored. In some cases, data may be retrieved from secondary memory and transmitted to primary memory, e.g., RAM, during operation of a computing device.

With continued reference to FIG. 1, memory 112 is communicatively connected to processor 108 and contains instructions configuring the processor 108 to perform any processing steps described herein. For the purposes of this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device. Communicative connecting may also include indirect connections via, for example and without limitation, wireless connection, radio communication, low-power wide-area network, optical communication, magnetic, capacitive, or optical coupling, and the like. In some instances, the terminology "communicatively coupled" may be used in place of communicatively connected in this disclosure.

With continued reference to FIG. 1, in one or more embodiments, at least a processor 108 may include a multi-core processor. For the purposes of this disclosure, a "multi-core processor" is an integrated circuit that contains at least two cores on a single chip. In some cases, at least two processor cores may work simultaneously, allowing multiple tasks to be executed in parallel. For the purposes of this disclosure, a "core" is an individual processor unit within a larger processing unit. The larger processing unit may include without limitation a central processing unit (CPU) or a graphics processing unit (GPU). In some cases, "core" and "processor" may be used interchangeably in this disclosure. Each core of at least two cores may be capable of reading and/or executing one or more program instructions, performing arithmetic operations, managing data, and/or communicating with other components within apparatus 100. As a nonlimiting example, at least a processor 108 may include a dual-core processor, quad-core processor, hexa-core processor, octa-core processor, many-core processor, or any processor that may perform simultaneous multi-threading (SMT) and/or dynamic core allocation, as recognized by a person of ordinary skill in the art upon reviewing the entirety of this disclosure. In some cases, at least a processor 108 may include one or more integrated graphics cores. In some cases, at least a processor 108 may include a cache architecture, wherein each core may include a private L1 (and in some cases, L2) cache, and all cores may share a larger L3 cache. In some cases, at least a processor 108 may integrate at least two cores that are not identical. As a nonlimiting example, a high-performance "heavy" core may be combined with an energy-efficient "lite" core. In some cases, a computing device may choose the best core for a task based on power and/or performance needs.

With continued reference to FIG. 1, apparatus 100 may include, be included in, or otherwise be communicatively connected to a database. For the purposes of this disclosure, a "database" is an organized collection of data or a type of data store based on the use of a database management system (DBMS), the software that interacts with end users, applications, and the database itself to capture and analyze the data. Database may be implemented, without limitation, as a relational database, a key-value retrieval database such as a NoSQL database, or any other format or structure for use as database that a person of ordinary skill in the art would recognize as suitable upon review of the entirety of this disclosure. Database may alternatively, or additionally, be implemented using a distributed data storage protocol and/or data structure, such as a distributed hash table or the like. Database may include a plurality of data entries and/or records as described in this disclosure. Data entries in database may be flagged with or linked to one or more additional elements of information, which may be reflected in data entry cells and/or in linked tables such as tables related by one or more indices in database or another relational database. A person of ordinary skill in the art, upon reviewing the entirety of this disclosure, will be aware of various ways in which data entries in database may store, retrieve, organize, and/or reflect data and/or records as used herein, as well as categories and/or populations of data consistently with this disclosure.

With continued reference to FIG. 1, in some cases, at least a processor 108 may be configured to query a database by searching within the database for a match. As a nonlimiting example, when a database includes a SQL database, processor 108 may be configured to submit one or more SQL queries to interact with the database. To retrieve data, a "SELECT" statement may be used to specify one or more columns, rows, table names, and/or the like, and optional conditions may be applied using WHERE clauses. In some cases, a DBMS may use indexes, if available, to quickly locate relevant rows and columns, ensuring accurate and efficient data retrieval. Once SQL queries are executed using a DBMS interface or code, results may be returned for further steps.

With continued reference to FIG. 1, at least a processor 108 is configured to receive task data 116. For the purposes of this disclosure, "task data" are data that are intended to be processed or executed by a computing device. Task data 116 may include any type of data deemed relevant to group computing by a person of ordinary skill in the art, upon reviewing the entirety of this disclosure. Exemplary types of task data 116 may include data describing and/or pertaining to scientific simulations and modeling, big data processing and analytics, machine learning and AI training, distributed databases and transaction processing, rendering and video processing, cryptography and blockchain, web services and content delivery, collaborative research projects, autonomous systems and edge computing, and financial modeling and risk analysis, among others. Task data 116 may include or be divided into a plurality of task data elements that may be processed separately, such as without limitation using different cores in a single computing device or using multiple computing devices in a network, as described in detail below. In one or more embodiments, task data 116 may include at least a configuration request that determines an initial allocation of the task data 116, as described in further detail below in this disclosure. For the purposes of this disclosure, a "configuration request" is a structured set of data or a command to provide a specific operational environment or resources. As a nonlimiting example, a configuration request may specify a level of confidentiality for certain tasks or data and the associated precautions or restrictions that should be taken or applied. Additional details of such configuration request will be described below in this disclosure.

With continued reference to FIG. 1, at least a processor 108 is further configured to determine a group computing need 120. For the purposes of this disclosure, a "group computing need" is an indication pertaining to whether group computing is necessary or preferred in order to process certain data or execute a certain computing task, and if so, how certain computational resources may be allocated. In some cases, group computing need 120 may be indicated using a binary indication such as "yes" vs. "no". In some cases, group computing need 120 may contain further specifications regarding computational resources such as central processing unit (CPU)/CPU cores, graphics processing unit (GPU), memory including without limitation random access memory (RAM) and/or cache memory, storage including without limitation hard disk drives (HDD), solid-state drives (SSD), cloud-based storage, etc., network bandwidth across multiple nodes (e.g., computers or servers) to process data or perform tasks in parallel, input/output (I/O) resources, virtual machines (VMs), containers, energy resources, task schedulers, data replication resources, fault tolerance mechanisms, latency optimization resources, bandwidth allocation mechanisms, auto-scaling resources, and/or cost allocation resources, among others. Additional details pertaining to some of these computational resources will be provided in detail below in this disclosure. As another nonlimiting example, group computing need 120 may specify the size of memory, including static memory, that needs to be set aside for completing a group computing task. As another nonlimiting example, group computing need 120 may specify the number of cores to be used, the number threads to be used within each core, the expected processing time of a task (i.e., CPU time) in each core, and/or an expected percentage of usage in each core, among others. As another nonlimiting example, group computing need 120 may specify a minimum number of secondary computing devices 124 needed to complete a group computing task. For the purposes of this disclosure, a secondary computing device is a computing device that is remote to, or distinct from, primary computing device 104. At least a secondary computing device 124 is communicatively connected to primary computing device 104 and may include or be implemented using any type of computing device deemed suitable as the primary computing device 104, consistent with details described above. Additional details pertaining to secondary computing devices 124 will be provided below in this disclosure.

With continued reference to FIG. 1, determining the group computing need 120 includes comparing task data 116 against a preset group computing criterion 128 and determining the group computing need 120 as a function of the comparison. For the purposes of this disclosure, a "preset group computing criterion" is a metric, limitation, recommended setting, and/or the like, within a computing device that needs to be factored in when using the computing device to process data or perform tasks. As a nonlimiting example, preset group computing criterion 128 may specify a maximum load in a core or processor 108. As a nonlimiting example, a preset group computing criterion 128 may specify a maximum size of memory available for processing certain data or completing certain tasks. As another nonlimiting example, a preset group computing criterion 128 may specify the thermal design power (TDP) of a core or processor, etc. For the purposes of this disclosure, "thermal design power (TDP)" is the maximum amount of heat a CPU is expected to generate under normal workloads. TDP may provide an indication of the power consumption and cooling requirements of a CPU.

Additionally, and/or alternatively, a preset group computing criterion 128 may include without limitation the clock speed of a CPU (i.e., the frequency at which a CPU operates, or how many cycles it can complete in a second), the total number of cores in a computing device, the number of available threads in a core, the number of instructions per second (IPS), the number of floating point operations per second (FLOPS), one or more CPU performance benchmarks, power consumption specifics, and/or the like.

With continued reference to FIG. 1, in one or more embodiments, at least a processor 108 may be further configured to receive real-time status data 132. For the purposes of this disclosure, "real-time status data" are data received in a real-time or substantially real-time manner after initiating a processing step. In some cases, at least a processor 108 may be configured to receive real-time status data 132 from primary computing device 104.

Additionally, and/or alternatively, in some cases, at least a processor 108 may be configured to receive real-time status data 132 from one or more secondary computing devices 124. As nonlimiting examples, real-time status data 132 may include or indicate whether a task element is active or inactive, if any error has occurred, whether a task element should continue or be aborted, any addition to, deletion from, and/or update to task data 116, among others. As a further nonlimiting example, real-time status data 132 may include or indicate whether one or more additional secondary computing devices 124 should be called upon to handle or take over a portion of an existing task. As a further nonlimiting example, real-time status data 132 may include or indicate whether one or more secondary computing devices currently in use (and CPU, memory, etc. therein) are no longer needed and may be freed up. As a further nonlimiting example, real-time status data 132 may include a percentage of completion for individual task elements. As a further nonlimiting example, real-time status data 132 may include an overall progress aggregated from individual task elements. As a further nonlimiting example, real-time status data 132 may include one or more identified bottlenecks in a sequence of processing steps. Accordingly, the at least a processor 108 may adjust group computing need 120 as a function of real-time status data 132, consistent with details described above.

With continued reference to FIG. 1, at least a processor 108 may be further configured to determine a hardware allocation 136 as a function of group computing need 120. For the purposes of this disclosure, "hardware allocation" is a physical computational resource or a group of physical computational resources configured and designated to handle a computational task element. Hardware allocation 136 may include without limitation an allocation of CPU, GPU, memory including RAM, storage, network bandwidth, and/or I/O resources, among others, consistent with details described above. Hardware allocation 136 may be localized in a single computing device, such as a primary computing device 104 or a secondary computing device 124. Hardware allocation 136 may be distributed across a group of computing devices, such as between a primary computing device 104 and at least a secondary computing device 124 communicatively connected thereto. In one or more embodiments, determining hardware allocation 136 may include determining a first hardware allocation 136a within primary computing device 104 and determining at least a second hardware allocation 136b within at least a secondary computing device 124. First hardware allocation 136 and at least a second hardware allocation 136 may then be combined as hardware allocation 136. Additional details will be provided below in this disclosure.

With continued reference to FIG. 1, at least a processor 108 may be further configured to create a virtual environment 140 using at least a secondary computing device 124, as a function of hardware allocation 136. For the purposes of this disclosure, a "virtual environment" is an isolated environment that simulates hardware or an operating system, allowing multiple applications or tasks to run independently on the same physical infrastructure. A virtual environment may abstract the underlying physical resources, such as without limitation CPU, memory, storage, and network, among others, and provide a controlled space where applications, processes, or entire operating systems can be deployed and executed without interference. A virtual environment may allow for the isolation of one or more software from a host operating system (host OS). Host OS may include a primary operating system installed on the hardware of a computing device, such as without limitation a secondary computing device 124. In some cases, host OS may manage underlaying physical resources and facilitate the running of one or more guest operating systems (guest OS). As a nonlimiting example, a Linux operating system running on a computing device as the primary operating system may be the host OS. Software applications integrated to a computing device, as described in further detail below, may accordingly be run atop the Linux operating system. In some cases, a virtual environment may be software-defined. As a nonlimiting example, a virtual environment 140 may include a simulated operating system that operates independently of the underlaying physical hardware of a computing device. In some cases, a virtual environment 140 may emulate one or more hardware, software, networks, and/or a combination thereof.

With continued reference to FIG. 1, in one or more embodiments, virtual environment 140 may include a plurality of partitions 144a-n. For the purposes of this disclosure, a "partition" is a subdivision of computational resources used to create an isolated environment. The resource may include storage, memory, processing power, or any other resource, as recognized by a person of ordinary skill in the art, upon reviewing the entirety of this disclosure. In one or more embodiments, processes or tasks running in one partition may not interfere with those running in another. In some cases, a partition may include memory partition (i.e., a section of a computer's RAM or storage), processor partition (i.e., a set of processor resources or cores), hardware partition (i.e., physical subdivision of a computing device into smaller units), logical partition (i.e., a virtualization of a separate computer), or any combinations thereof. Plurality of partitions 144 may include a first partition 144a and at least a second partition 144b. In some cases, plurality of partitions 144a-n may further include a third partition 144c, a fourth partition 144d, . . . , an Nth partition 144n. For the purposes of this disclosure, a "first partition" is a partition of a plurality of partitions. In some cases, a first partition 144a may include a boot partition from which an operating system loads or boots up. In some cases, a first partition 144a may include a primary memory partition, wherein the initial memory is allocated for a software to load, as described in further detail below. In some cases, a first partition 144a may include a main processing partition. As a nonlimiting example, a first partition may be responsible for primary tasks such as without limitation system management, control tasks, and/or the like, as described herein. For the purposes of this disclosure, a "second partition" is a separate, distinct operating space within virtual environment 140 that is distinct from a first partition 144a, as described above. It is worth noting that the designation of first partition 144a and second partition 144b may be arbitrary and a matter of perspective. As a nonlimiting example, a first partition 144a/second partition 144b may only include hardware resources of primary computing device 104 and/or secondary computing device 124. As another nonlimiting example, a first partition 144a/second partition 144b may include a combination of a portion of hardware resources of primary computing device 104 and a portion of hardware resources of at least a secondary computing device 124, consistent with details described above pertaining to hardware allocation 136. Additional details regarding partitions will be provided below in this disclosure.

With continued reference to FIG. 1, in one or more embodiments, virtual environment 140 may further include at least a hypervisor 148. For the purposes of this disclosure, a "hypervisor" is a software or firmware that allows multiple virtual computing devices to run on a single physical machine, sharing its resources including without limitation CPU, memory, and storage, among others. A hypervisor may create and manage these virtual environments, making it possible for each virtual computing device to run its own operating system and applications independently, as if it were a separate physical system. In one or more embodiments, a hypervisor 148 may include software configured as a virtual machine monitor (VMM). In some cases, a hypervisor 148 may be configured to allow a physical machine, such as a computing device, to run a plurality of operating systems simultaneously by virtualizing system hardware e.g., processors, memory, I/O devices, and/or the like. In some cases, a hypervisor 148 may run directly on the hardware of a computing device without reliance of an operating system. Instantiating a hypervisor 148 may include launching or initializing the hypervisor 148 in a host operating system. In some cases, instantiation of a hypervisor 148 may create a virtual environment wherein a plurality of partitions 144a-n may be run and managed.

With continued reference to FIG. 1, in one or more embodiments, at least a processor 108 may be configured to deploy a static partitioning 152 that isolates first partition 144 from at least a second partition 144. For the purposes of this disclosure, a "static partitioning" is a predefined barrier in a virtual environment that separates one set of physical resources from another. Such physical resources may include without limitation CPU, memory, storage, and network bandwidth, among others, consistent with details described above.

With continued reference to FIG. 1, in some cases, at least a hypervisor 148 may be configured to deploy at least a virtual machine (VM) 156 as a function of static partitioning 152. For the purposes of this disclosure, a "virtual machine (VM)" is a software-based emulation of a physical computing device that runs an operating system (OS) and one or more applications therein just like a physical machine would. A VM may run on top of a physical host system but be completely isolated from it, allowing multiple VMs to run on the same hardware independently. Each VM behaves as though it is a separate, physical computer, with its own virtualized CPU, memory, storage, and network resources. As a nonlimiting example, at least a hypervisor 148 may create one or more VMs 156, wherein each VM 156 may host a sperate and isolated software operating environment (SOE). Additional details will be provided below in this disclosure.

With continued reference to FIG. 1, in one or more embodiments, hypervisor 148 may include a "type 1 hypervisor" that runs independently of its host operating environment. As a nonlimiting example, a type 1 hypervisor may include a bare-metal hypervisor that runs directly on the hardware of a computing device and manages one or more guest operating systems. Exemplary type 1 hypervisors may include without limitation MICROSOFT HYPER-V, VMWARE ESXI, XEN, and/or the like. In some cases, VMs 156 created by a type 1 hypervisor may communicate directly with the hardware of a computing device rather than a host operating system. In some cases, VMs 156 created by a type 1 hypervisor may not be susceptible to issues caused by a host operating system and/or other VMs 156 in virtual environment 140. As a nonlimiting example, one or more VMs 156 may be isolated and unaware of the existence of other VMs 156. In one or more embodiments, a type 1 hypervisor may allow for an increased performance wherein VMs 156 within a virtual environment 140 may communicate directly with hardware rather than through an intermediate host operating system. As a nonlimiting example, a type 1 hypervisor may allow one or more VMs 156 to run simultaneously, wherein a failure of a first VM 156 may not result in a failure of a second VM 156.

With continued reference to FIG. 1, in one or more embodiments, hypervisor 148 may include a "type 2 hypervisor" that runs atop host operating system in a manner similar to a software application. In one or more embodiments, a type 2 hypervisor may include a hosted hypervisor having resource allocation occurred right above host operating system. In some cases, a type 2 hypervisor may rely on a host operating system of a computing device, whereas a type 1 hypervisor, as described above, may only rely on the hardware of a computing device. Exemplary type 2 hypervisors may include without limitation VMWARE WORK-STATION, ORACLE VIRTUAL BOX, and/or the like. In some cases, when instantiating a type 2 hypervisor, at least a processor 108 may launch the type 2 hypervisor that has been pre-installed, in a manner similar to launching any software application. Once a host operating system is up and running, at least a processor 108 may then start a type 2 hypervisor to create, manage and run VMs 156 atop the host operating system. However, for a type 1 hypervisor, since it runs directly on "bare metal" (i.e., hardware without requiring an underlying operating system), instantiating a type 1 hypervisor may involve booting the system from a medium such as, without limitation, a USB drive, CD, or a network source containing the type 1 hypervisor. Once booted, the type 1 hypervisor may then take control of at least a portion of hardware resources and manage and/or launch one or more VMs 156.

With continued reference to FIG. 1, in one or more embodiments, at least a processor 108 may be further configured to receive supplemental task data 116 and adjust connections between the first partition 144*a* and the at least a second partition 144*b* within virtual environment 140, as a function of the supplemental task data 116. Supplemental task data 116 may include any type of data relevant to task data 116, as described above in this disclosure. In one or more embodiments, at least a processor 108 may be further configured to integrate at least a software module into the virtual environment. Additional details will be provided below in this disclosure.

With continued reference to FIG. 1, at least a processor 108 is further configured to allocate at least a portion of task data 116 to at least a secondary computing device 124, as a function of group computing need 120, consistent with details described above. The at least a portion of the task data 116 is subsequently executed by the at least a secondary computing device 124. In one or more embodiments, allocating at least a portion of task data 116 may include allocating the at least a portion of the task data 116 using a modified web transfer protocol 160. For the purposes of this disclosure, a "modified web transfer protocol is an adaptation of an existing web transfer protocol (such as HTTP or HTTPS) that has been altered or extended to meet specific requirements or improve upon the existing features of the standard protocol. Modifications may be implemented to enhance security, performance, data handling, or efficiency in specialized use cases. A modified web transfer protocol may be implemented to meet the unique requirements of web applications, enterprise systems, or specialized communication scenarios such as without limitation real-time streaming or Internet of Things (IoT). Nonlimiting examples of modified transfer protocols include HTTP/2, Quick UDP Internet Connections (QUIC), WebSocket, and/or the like.

With continued reference to FIG. 1, a computing device, such as without limitation primary computing device 104, may perform determinations, classification, and/or analysis steps, methods, processes, or the like as described in this disclosure using machine-learning processes. For the purposes of this disclosure, a "machine-learning process" is a process that automatedly uses a body of data known as "training data" and/or a "training set" to generate an algorithm that will be performed by a processor module to produce outputs given data provided as inputs. This is in contrast to a non-machine-learning software program where the commands to be executed are determined in advance by a user and written in a programming language. A machine-learning process may utilize supervised, unsupervised, lazy-learning processes and/or neural networks. More details regarding computing devices and machine-learning processes will be provided below.

With continued reference to FIG. 1, in one or more embodiments, one or more machine-learning models may be used to perform certain function or functions of apparatus 100, such as without limitation modifying an allocation of task data 116, as described below. At least a processor 108 may use a machine-learning module to implement one or more algorithms as described herein or generate one or more machine-learning models, such as an allocation machine-learning model, as described below. However, machine-learning module is exemplary and may not be necessary to generate one or more machine-learning models and perform any machine learning described herein. In one or more embodiments, one or more machine-learning models may be generated using training data. Training data may include inputs and corresponding predetermined outputs so that machine-learning model may use correlations between the provided exemplary inputs and outputs to develop an algorithm and/or relationship that then allows the machine-learning model to determine its own outputs for inputs. Training data may contain correlations that a machine-learning process may use to model relationships between two or more categories of data elements. Exemplary inputs and outputs may be retrieved from a database or be provided by a user. In one or more embodiments, machine-learning module may obtain training data by querying a communicatively connected database that includes past inputs and outputs. Training data may include inputs from various types of databases, resources, and/or user inputs and outputs correlated to each of those inputs, so that machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a nonlimiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In one or more embodiments, training data may include previous outputs such that one or more machine-learning models may iteratively produce outputs.

With continued reference to FIG. 1, in one or more embodiments, when group computing need 120 is adjusted, at least a processor 108 may subsequently modify an allocation of task data 116 between primary computing device 104 and at least a secondary computing device 124, as a function of adjusted group computing need 120. Such modification may provide dynamic load balancing between a group of computing devices, thereby preventing a single computing device from becoming overwhelmed, ensuring an efficient use of computational resources, and removing processing bottle necks. In some cases, modifying allocation of task data 116 may involve using a machine-learning model. Specifically, modifying the allocation of the task data may include receiving allocation training data 164 including a plurality of exemplary allocations as outputs correlated to a plurality of exemplary group computing needs as inputs. Allocation training data 164 may be used to train an allocation machine-learning model 168. Subsequently, at least a processor 108 may modify allocation of task data 116 as a function of trained allocation machine-learning model 168. Implementation of allocation machine-learning model 168 may be consistent with any type of machine-learning model or algorithm described in this disclosure. In one or more embodiments, allocation training data may include data specifically synthesized for training purposes using one or more generative models. In one or more embodiments, one or more historical task data may be incorporated into allocation training data 164 upon validation. In one or more embodiments, allocation training data 164 may be retrieved from one or more databases and/or other repositories of similar nature or be supplied as one or more inputs from one or more users. In one or more embodiments, at least a portion of allocation training data 164 may be added, deleted, replaced, or otherwise updated as a function of one or more inputs from one or more users. A person of ordinary skill in the art, upon reviewing the entirety of this disclosure, will be able to recognize suitable means to allocation machine-learning model 168 in apparatus 100.

With continued reference to FIG. 1, at least a processor 108 is further configured to receive from at least a secondary computing device 124 a processing result 172. Such processing result may include any type of result deemed relevant by a person of ordinary skill in the art, upon reviewing the entirety of this disclosure. Nonlimiting examples of processing results may include numerical values of a calculation, texts, reports, tables, charts, images, 2D maps, 3D models or structures, among others.

With continued reference to FIG. 1, in or more embodiments, apparatus 100 may implement one or more aspects of Future Airborne Computing Environment (FACE™). For the purposes of this disclosure, a "Future Airborne Computing Environment" is a technical standard and business strategy for promoting acquisition of open systems software architecture in aviation industry, specifically for military avionics system. In some cases, apparatus 100 may employ FACE approach, wherein host circuit 204 may run in a common operating environment to support one or more portable capability software applications across a plurality of department of defense (DoD) avionics systems. In some cases, FACE may include a plurality of software application programming interfaces (APIs) grouped into "segments". As a nonlimiting example, FACE may include operating system segments (OSS), platform specific services segment (PSSS), input/output (I/O) service segment, transport services segment, and/or the like. In some cases, FACE may provide a bounding box around software items and APIs, i.e., FACE Boundary. In some cases, apparatus 100 may include one or more extensions to FACE that satisfy safety assumptions in hardware outside FACE Boundary. As a nonlimiting example, FACE may include a plurality of API groups (i.e., segments), wherein one or more API groups may be dependent for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. As a nonlimiting example, FACE may include a health monitoring monitor, interface hardware such as without limitation Ethernet device driver (within operating system segment) configured to infer specific hardware assumptions. For the purposes of this disclosure, an "application programming interface" is a way for two or more computer programs or components to communicate with each other. It is a type of software interface that offers one or more services to other pieces of software. An application programming interface may be written in programming languages such as C++, Java, Pascal, JavaScript, CFML, PHP, Ruby, Python, or the like. A document or standard that describes how to build or use such a connection or interface is called an application programming interface specification. A computer system that meets this standard is said to implement or expose an application programming interface. The term application programming interface may refer either to the specification or to the implementation. Whereas a system's user interface, as described below, dictates how its end users interact with the system in question, its application programming interface dictates how to write code that takes advantage of that system's capabilities. In contrast to a user interface, which connects a computer to end user, an application programming interface connects computers or pieces of software to each other. It is not intended to be used directly by an end user other than a programmer who is incorporating it into the software. An application programming interface is often made up of different parts which act as tools or services that are available to a programmer. A program or programmer that uses one of these parts is said to call that portion of the application programming interface. Calls that make up the application programming interface are also known as subroutines, methods, requests, or endpoints. An application programming interface specification defines these calls and explains how to use or implement them. One purpose of application programming interfaces is to hide the internal details of how a system works, exposing only those parts that a programmer will find useful, and keeping them consistent even if the internal details change later. Application programming interface may be custom-built for a particular pair of systems, or it may be a shared standard allowing interoperability among many systems. A person of ordinary skill in the art will recognize how to implement one or more application programming interfaces within this invention upon reviewing the entirety of this disclosure.

With continued reference to FIG. 1, details described herein pertaining to apparatus 100 may be consistent with any detail disclosed in U.S. patent application Ser. No. 18/395,149, filed on Dec. 22, 2023, entitled "APPARATUS AND METHOD FOR PROVIDING A SAFETY-CRITICAL OPERATING ENVIRONMENT (SCOE)", U.S. patent application Ser. No. 18/395,210, filed on Dec. 22, 2023, entitled "SYSTEM AND METHOD FOR A SAFETY CRITICAL OPERATING ENVIRONMENT CONTAINER ARCHITECTURE", and U.S. patent application Ser. No. 18/443,540, filed on Feb. 16, 2024, entitled "APPARATUS AND METHODS FOR A MISSION CRITICAL OPERATING ENVIRONMENT CONTAINER ARCHITECTURE", the entirety of each of which is incorporated herein by reference.

Figure 2:
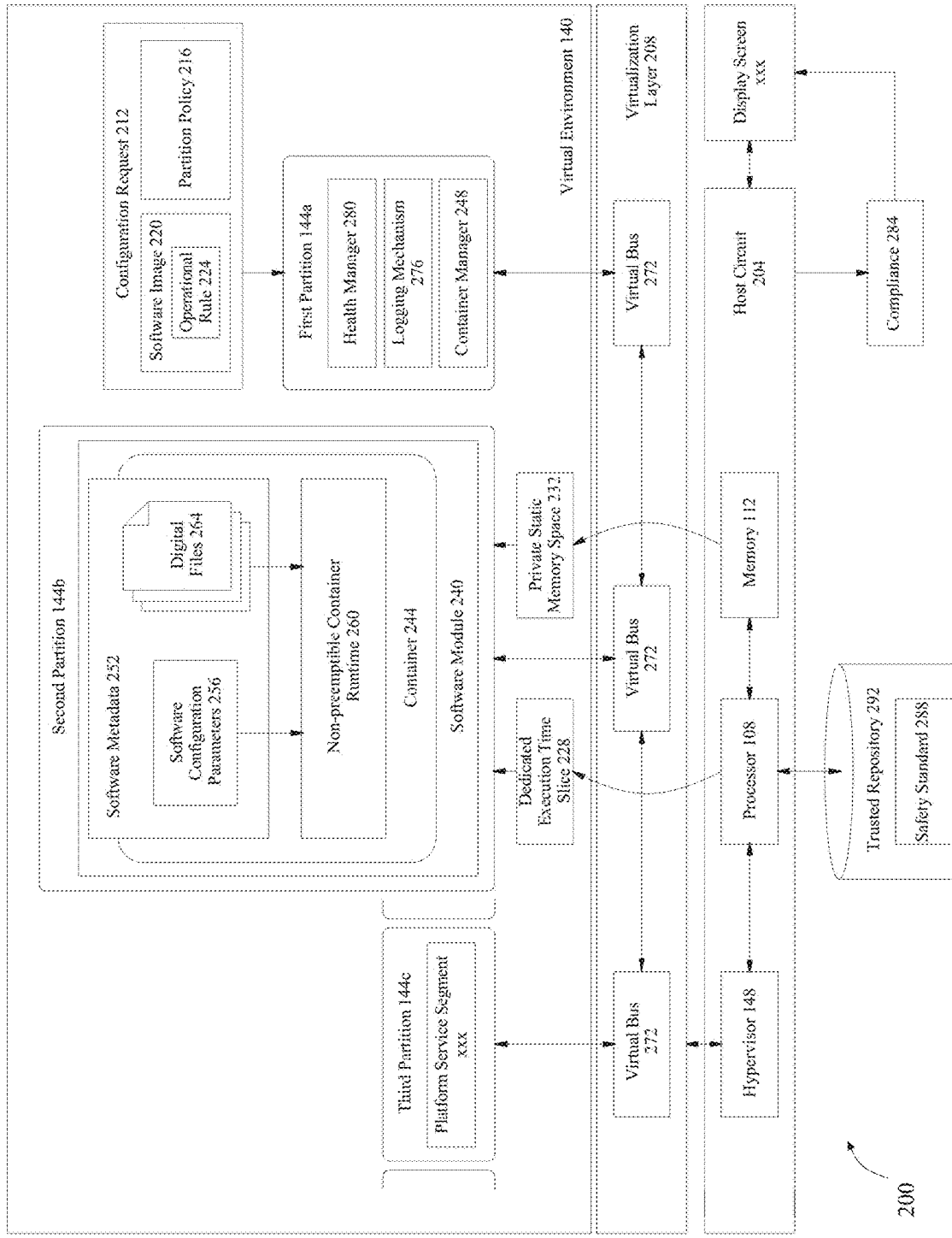
FIG. 2 is an exemplary embodiment of a block diagram illustrating a virtual environment pertaining to the apparatus described in FIG. 1.

Referring now to FIG. 2, an exemplary embodiment 200 of a virtual environment 140 and elements related thereto is illustrated. Virtual environment 140 is created using a host circuit 204. For the purposes of this disclosure, a "host circuit" is an integrated circuit or a collection of interconnected circuits designed to manage, control, and/or interface with one or more functionalities in a system. As a nonlimiting example, host circuit 204 may be configured as a primary platform or base that provides essential infrastructure, resources, and interfaces to facilitate the operation of other connected or integrated components. Host circuit 204 may include any computing device as described in this disclosure.

With continued reference to FIG. 2, host circuit 204 operates a first partition 144a within virtual environment 140, consistent with details described above in this disclosure. As a nonlimiting example, plurality of partitions 144a-n, e.g., first partition 144a, second partition 144b, third partition 144c, etc., may be allocated inside virtual environment 140, wherein each partition 144a-n of plurality of partitions 144a-n includes a virtual machine (VM) 156. Operating first partition 144a may include instantiating a hypervisor 148, consistent with details described above.

With continued reference to FIG. 2, in one or more embodiments, at least a processor 108 may generate a virtualization layer 208 supervised by hypervisor 148, wherein first partition 144a within virtual environment 140 is operated by the virtualization layer 208. For the purposes of this disclosure, a "virtualization layer" is a software layer or interface that sits between a hardware layer and virtual environment 140 having one or more VMs 156. The hardware layer may include without limitation a physical CPU, memory, I/O devices, and/or the like. In some cases, virtualization layer 208 may be configured to virtualize the underlaying hardware resources and present the virtualized hardware resources to plurality of VMs 156 as if they are dedicated to each VM 156. As a nonlimiting example, a plurality of partitions, as described herein, may share the same physical hardware resources through virtualization layer 208, without being aware of each other. In some cases, virtualization layer 208 may be instantiated when hypervisor 148 is booted or launched. As a nonlimiting example, in case of a type 1 hypervisor, virtualization layer 208 may be generated when machine starts up, since hypervisor 148 directly interfaces with the hardware. In another nonlimiting example, in case of a type 2 hypervisor, virtualization layer may be established once a hypervisor software is initiated on top of a host OS. In some cases, hypervisor 148 may be configured to monitor and/or manage one or more hardware abstraction and allocate these virtualized resources to designated VMs 156. As a nonlimiting example, virtualized resources may include CPU time, memory space, I/O operations and/or the like. In some cases, virtualized resources may be allocated based on a partition policy as described in detail below. In some cases, hypervisor 148 may manage the scheduling of VM tasks on actual cores. In some cases, hypervisor 148 may handle interruptions, exceptions, and any events that may occur, deciding which VM 156 or service needs attention. In some cases, hypervisor 148 may be configured to isolate one or more VMs 156 from the rest of VMs 156 to maintain system security and stability. In other cases, hypervisor 148 may be configured to manage lifecycle operations of one or more VMs 156 such as without limitation creation, modification, deletion, migration, and/or the like.

With continued reference to FIG. 2, as a nonlimiting example, when first partition 144a is created, a pre-defined set of virtual hardware resources may be provided by virtualization layer 208. The pre-defined set of virtual hardware resources may include without limitation a portion of virtualized memory, virtual disks, virtual network interfaces, among others. As first partition 144a attempts to execute one or more operations or access its "hardware", the first partition 144a may actually interface with virtualization layer 208. As a nonlimiting example, when a VM 156 tries to use at least a processor 108, it may be scheduled by hypervisor 148 onto a physical processor within host circuit 204, through virtualization layer 208. In some cases, first partition 144a may perceive these resources as if they are dedicated hardware components, oblivious to the abstraction layer beneath. In some cases, virtualization layer 208 may handle I/O operations, translating virtual disk or network accesses to actual operations on a physical hardware. Any interruption, exception, or system call made by first partition 144a may be intercepted by virtualization layer 208, which may then communicate with hypervisor 148 to handle or service that request.

With continued reference to FIG. 2, in some cases, hypervisor 148 may include single root input output virtualization (SR-IOV). For the purposes of this disclosure, "single root input output virtualization" is a software capability in which single peripheral component interconnect express (PCIe) devices may be virtualized into multiple virtual devices. As a nonlimiting example, a network adapter may be virtualized wherein multiple virtual adapters may exist. In one or more embodiments, SR-IOV may include a virtualization of physical components such as without limitation a GPU, network adapter, storage controllers, Field Programmable Gate Array (FPGA) devices, audio processing cards, solid state drives, and/or the like. In one or more embodiments, SR-IOV may allow for partitions to access a single physical device. In one or more embodiments, first partition 144a may have direct access to a physical device without an operating system allocating resources. In one or more embodiments, SR-IOV may allow for resources to be shared, such as without limitation network adapters, while still maintaining independence. In one or more embodiments, SR-IOV may allow for multiple VMs 156 operating on hypervisor 148, e.g., a type 1 hypervisor, to have access to physical devices without an intermediary such as a shot operating system. In one or more embodiments, host circuit 204 may contain physical hardware that is capable of virtualization. In one or more embodiments, hypervisor 148 may contain the proper systems and/or software to enable SR-IOV, wherein a VM 156 may receive a virtual component. In one or more embodiments, SR-IOV may allow for one or more separate virtual environments with direct access to one or more physical hardware components of host circuit 204.

With continued reference to FIG. 2, in some embodiments, in one or more embodiments, plurality of partitions 144a-n may include at least a dedicated partition, wherein one or more I/O operations may be consolidated into the at least a dedicated partition. In some cases, such partition may include a specialized VM 156 that is configured to manage and handle I/O operations for other VMs 156, acting as an intermediary between plurality of partitions 144a-n and/or quest VMs 156 and physical hardware resources through an I/O physical bus, e.g., a virtualized PCI bus that connects devices to the main system. As a nonlimiting example, at least a dedicated partition 144a-n may include an I/O VM 156 containing a plurality of FACE I/O service segments (IOSS), wherein each IOSS may provide a standardized interface between OSS and platform-specific hardware. An I/O VM 156 may be configured to manage all I/O operations in adherence to FACE technical standards, as described above. As a nonlimiting example, through a plurality of IOSS, an I/O VM 156 may include a VM 156 that interface directly with a platform's avionic hardware connected to host circuit 204, in a way that is standardized across different air vehicles and systems. In some cases, standardized device drives and/or adapters may be provided by IOSS for various avionic devices. As a nonlimiting example, when a quest VM 156 or a software application integrated into the system as described below wants to access a hardware resources, it may be configured to indirectly communicate with an I/O VM 156, and a plurality of IOSS having standardized drivers for the hardware may process the request as per pre-defined system specification (e.g., FACE specification). In such cases, other partitions or VMs 156 may be less susceptible to I/O-related faults or security breaches. Security protocols may be standardized and attach surface may be reduced by centralizing drivers and I/O operations, since other VMs 156 do not directly access I/O hardware, thereby reducing potential vulnerabilities. In some other cases, updates or changes to one or more I/O device drivers or I/O related services may be done in a I/O VM 156 without affecting or rebooting the rest of VMs 156.

With continued reference to FIG. 2, in one or more embodiments, at least a processor 108 may be configured to receive a configuration request 212 from first partition 144a, wherein the configuration request 212 includes at least a partition policy 216 and a software image 220. In some cases, configuration request 212 may be sent by a software entity, as described below, or a component such as without limitation one or more partitions 144a-n within virtual environment 140, asking another entity, such as without limitation a host OS or hypervisor 148, to establish, modify, and/or provide a desired SOE. As a nonlimiting example, first partition 144a may include a management VM 156 configured to monitor, manage, and/or administer overall operations and resources within virtual environment 140. As another nonlimiting example, first partition 144a may include, or at least interfacing with, one or more health monitors, system health management PSSS, aircraft system monitoring PCS, operational mode management PCS, and/or the like.

With continued reference to FIG. 2, for the purpose of this disclosure, a "partition policy" is a rule, constraint, or configuration pertaining to how a partition 144a-n or a virtual machine 156/container within virtual environment 140 accesses resources. In some cases, at least a partition policy 216 may be used to set forth static partitioning 152, as described above. In some cases, at least a partition policy 216 may specify how much CPU, memory, storage, network bandwidth and/or the like a partition 144a-n in question may utilize. In some cases, at least a partition policy 216 may also determine the scheduling policy for a partition 144a-n, for example and without limitation, the priority/operating time of the partition 144a-n and/or whether it's preemptible. In some embodiments, at least a partition policy 216 may define a level of separation between plurality of partitions 144a-n to ensure that the operation of one partition 144a-n doesn't adversely impact the operation of another partition 144a-n. In such embodiments, this configuration may prevent failures from propagating. In some cases, partition policy 216 may also outline what resources e.g., I/O devices, data files, network interfaces, and/or the like, a partition 144a-n may be able to access. In some cases, partition policy 216 may include a level of access (e.g., read, write, execute, and the like). As a nonlimiting example, in an aviation system, at least a partition policy 216 may be configured to ensure that a partition 144a-n handling a flight control logic gets the highest priority and is isolated from partitions 144a-n handling non-critical tasks, e.g., in-flight entertainment. As another nonlimiting example, partition policies 216 may balance computing resources allocation for achieving a desired system performance e.g., a desired energy efficiency, ensuring that each VM 156 gets only the resources it needs.

With continued reference to FIG. 2, for the purposes of this disclosure, a "software image", also known as a "container image", is a snapshot or a packaged representation of an entire software state, including executable code, configurations, dependencies/libraries, and other required data. In some cases, software image 220 may include source code, libraries, and other software components that the software relies upon. In some cases, software image 220 may include one or more configuration files which define a plurality of settings, parameters, and other configurations for the software. In some cases, configuration files may include certain OS configurations, environmental variables, and/or other system-level settings. As a nonlimiting example, software image 220 may include a portable executable image combined with a manifest file that is used by a container manager, as described below, to deploy the software image 220 on an operating environment with appropriate data services and restrictions. In some cases, first partition 144a may interface with a software image repository containing a plurality of software images 220. In some cases, software image 220 may be used to package a software application with its entire collection of dependencies, ensuring that the software application may run consistently across different SOEs. Exemplary software applications may include without limitation flight management system (FMS) software, air traffic control (ATC) software, avionics software, electronic flight bag (EFB) software, ground support equipment software, weather forecasting and reporting software, cockpit display rendering software, and/or the like. In some cases, software image 220 may include a VM image that encapsulates a whole OS along with one or more pre-installed software applications. Such software image 220 may be easily replicated across a plurality of host circuits 204, e.g., servers or a cloud environment. In some other cases, software image 220 may be used as a backup snapshot to restore/roll back system or a software application to a known working state.

With continued reference to FIG. 2, in one or more embodiments, software images 220 may include a pre-defined operational rule 224. For the purposes of this disclosure, a "pre-defined operational rule" is a set of instructions or conditions that dictate how a software, when executed, should behave, respond, or operate under specific scenarios or environment. As a nonlimiting example, pre-defined operational rule 224 may encapsulate business logic or functional requirements of a software. In some cases, pre-defined operational rule 224 may specify a plurality of core functionalities and processes that a software is intended to perform. In some cases, per-defined operational rule 224 may include one or more error handling procedures, i.e., how software should respond to unexpected inputs or errors. In some cases, pre-defined operational rule 224 may include one or more security protocols, such as without limitation instructions related to authentication, authorization, data protection, and/or the like. Additionally, or alternatively, in some cases, pre-defined operational rule 224 may include one or more conditions and/or thresholds for software performance, e.g., response times, execution times, and/or the like. In one or more embodiments, a pre-defined operational rule 224 may be configured as a metric to ensure that a software application behaves in a pre-defined way. In one or more embodiments, a pre-defined operational rule 224 may dictate fail-safe behaviors or fallback procedures. As a nonlimiting example, a pre-defined operational rule 224 may dictate how a software application should respond if one or more sensors communicatively connected to host circuit 204 detects a certain anomaly in flight data during cruising, e.g., automatically engaging an emergency procedure. As another nonlimiting example, a pre-defined operational rule 224 may specify the process and validations for pilot inputs. In some cases, a missing pre-defined operational rule 224 may result in a failure to execute at least a part of the software application. In some cases, a pre-defined operational rule 224 may entirely depend on system health and safety; for example, and without limitation, a pre-defined operational rule 224 may be qualified under DO-178C or to ensure the availability, robustness, and integrity of an SOE.

With continued reference to FIG. 2, additionally, or alternatively, in one or more embodiments, configuration request 212 may be encrypted, by a virtual machine 156, a hypervisor 148, and/or a software/software module (as described below) in first partition 144a, prior to its transmission. In one or more embodiments, elements within first partition 144a may implement one or more aspects of a cryptographic system. For the purposes of this disclosure, a "cryptographic system" a system that converts data from a first form, known as "plaintext", which is intelligible when viewed in its intended format, into a second form, known as "ciphertext", which is not intelligible when viewed in the same way. The data to be converted by a cryptographic system may include without limitation configuration request 212, as described above. In some cases, configuration request 212 may be unintelligible in any format unless first converted back to plaintext. Such process of converting plaintext into ciphertext is known as "encryption". In some cases, encrypting configuration request 212 may include the use of a datum, such as an "encryption key", to alter plaintext configuration request 212. In some cases, at least a processor 108 (and first partition 144a) may convert ciphertext back into plaintext, which is a process known as "decryption". At least a processor 108 may be configured to decrypt configuration request 212 upon receipt. Decrypting configuration request 212 may include the use of another datum, such as a "decryption key", to return the ciphertext to its original plaintext form. In one or more embodiments, cryptographic system implemented by first partition 144a may include a "symmetric cryptographic system", wherein the decryption key may be essentially the same as the encryption key. As a nonlimiting example, possession of either key may make it possible to deduce the other key quickly without further secret knowledge. In some cases, encryption and decryption keys in symmetric cryptographic systems may be kept secret and shared only with trusted entities such as, without limitation, trusted partitions and/or at least a processor 108. As a nonlimiting example, first partition 144a may include an Advanced Encryption Standard ("AES"), which arranges configuration request 212 containing partition policy 216 and software image 220 into matrices and then modifies the matrices through repeated permutations and arithmetic operations with an encryption key.

With continued reference to FIG. 2, in some cases, first partition 144a may include an asymmetric cryptographic system, wherein either encryption or decryption key cannot be readily deduced without additional secret knowledge, even given the possession of a corresponding decryption or encryption key, respectively. As a nonlimiting example, first partition 144a may implement a "public key cryptographic system", in which possession of an encryption key does not make it practically feasible to deduce its corresponding decryption key, so that the encryption key may safely be made available to the public e.g., all partitions 144a-n within virtual environment 140. In some cases, public key cryptographic system may include Rivest-Shamir-Adleman (RSA), in which an encryption key involves the use of numbers that are products of very large prime numbers, but a decryption key involves the use of those very large prime numbers, such that deducing the decryption key from the encryption key requires a practically infeasible task of computing the prime factors of a number which is the product of two very large prime numbers. In some cases, first partition 144a may employ an elliptic curve cryptography, wherein the elliptic curve cryptography may rely on the fact that given two points, P and Q, on an elliptic curve over a finite field, and a definition for addition where A+B=-R, the point where a line connecting point A and point B intersects the elliptic curve. "0", the identity, is a point at infinity in a projective plane containing the elliptic curve. Finding a number k such that adding P to itself k times results in Q is computationally impractical, given a correctly selected elliptic curve, finite field, and P and Q.

With continued reference to FIG. 2, in some cases, configuration request 212 may be configured to initiate an encrypted handshake between two partitions 144a-n or between a partition 144a-n and an external system, wherein such handshake may involve an exchange of one or more encrypted messages to verify the identity of parties involved. As a nonlimiting example, first partition 144a may send configuration request 212 to at least a processor 108 to initiate a secure connection with a second partition 144a-n, as described in detail below, using a transport layer security (TLS) protocol, wherein both partitions 144a-n prove their identities to each other using encrypted keys. In some cases, configuration request 212 may specify that data stored or transmitted by one or more partitions 144a-n should be encrypted using AES, as described above. As a nonlimiting example, configuration request 212 may dictate that any data saved to disk by one or more partitions 144a-n must be encrypted with an AES-256 key. Only parties with the decryption key may transform ciphertext back into plaintext upon reading. In some cases, when two different keys are involved, one or more partitions 144a-n may use private keys to decrypt messages encrypted with corresponding public keys.

With continued reference to FIG. 2, in one or more embodiments, at least a processor 108 may be configured to verify the integrity of data or to ensure that configuration request 212 hasn't been tampered with using cryptographic hashes. For the purposes of this disclosure, a "cryptographic hash" or "hash", as used herein, is a mathematical representation of data, wherein the mathematical representation is produced by a lossy "one-way" algorithm known as a "hashing algorithm". Data to be represented by a hash may include without limitation configuration request 212 and data therewithin. In some cases, a hashing algorithm may be a repeatable process; that is, identical data may produce identical hashes each time they are subjected to a particular hashing algorithm. Since hashing algorithm is a one-way function, it may be impossible to reconstruct a lot of data from a hash produced from a lot of data using the hashing algorithm. In some cases, hashing algorithm may include one or more processes that reconstruct the full data from the corresponding hash using a partial set of data from the full data, which may be possible only by repeatedly guessing at the remaining data and repeating the hashing algorithm. It is thus computationally difficult, if not infeasible, for a single computer to produce the data, as the statistical likelihood of correctly guessing the missing data may be extremely low. As a nonlimiting example, when a configuration request 212 is sent, a SHA-256 hash of the request may be generated and sent alongside. At least a processor 108 or receiving partition 144a-n may hash the received configuration request 212 using the same algorithm and check if the hashes match to verify the data integrity.

With continued reference to FIG. 2, in one or more embodiments, at least a processor 108 may be configured to create a second partition 144b within virtual environment 140 as a function of configuration request 212. At least a processor 108 is configured to allocate a dedicated execution time slice 228 and a private static memory space 232 for second partition 144b using hypervisor 148, based on at least one partition policy 216, as described above. As a nonlimiting example, partition policy 216 may follow a particular partitioning design in which the partitioning is provided above a minimal kernel, as described in detail below with reference to FIG. 3, with specific resource guarantees. For the purposes of this disclosure, a "dedicated execution time slice" is an allocation of processor time. In one or more embodiments, hypervisor 148 described herein may be configured to create plurality of partitions 144a-n in a real-time operating system (RTOS) and virtual environment 140. As a nonlimiting example, host OS may include a RTOS. For the purposes of this disclosure, a "real-time operating system (RTOS)" is an operating system that is designed to serve real-time software applications that process data without buffer delays. In some cases, a RTOS may include a tolerance for processing delays. As a nonlimiting example, a dedicated execution time slice 228 may include a guaranteed access to CPU time within a defined schedule for a designated partition 144a-n, e.g., second partition 144b. Virtualization layer 208 may allow multiple OS to share single hardware host, i.e., host circuit 204, wherein a hypervisor 148 within the virtualization layer 208 may be responsible for managing CPU resources among a plurality of partitions 144a-n. As a nonlimiting example, one or more scheduling algorithms, e.g., round-robin, rate-monotonic, earliest deadline first, and/or the like, may be used to allocate CPU time to second partition 144b. In some cases, hypervisor 148 may enforce dedicated execution time slice 228 so that each partition 144a-n receives a desired processor time it requires to execute at least one operational rule 224, as described above, within its allotted window. In some cases, second partition 144b may be temporally isolated from other partitions 180a-c, thereby preventing the second partition 144b from hogging at least a processor 108 through virtualization layer 208 and causing performance degradation in other partitions 144a-n within the virtual environment 140. In some cases, one or more machine-learning models, as described below, may be used to intelligently determine a desired execution time slice 228 based on received software image 220 and/or at least one operational rule 224.

With continued reference to FIG. 2, for the purposes of this disclosure, a "private static memory space" is a fixed amount of memory allocated to a specific partition 144a-n that is not shared with or accessible by one or more other partitions 144a-n. In some cases, hypervisor 148 may be configured to spatially isolate second partition 144b from other partitions 144a-n within virtual environment 140 through such memory allocation. This step may be done, at least in part, for one or more performance and/or security purposes. As a nonlimiting example, upon creating a second partition 144b, hypervisor 148 may configure system's memory management unit (MMU), as described above, to allocate at least a block of physical memory to the second partition 144b according to partition policy 216. In some cases, private static memory space may be made exclusive to second partition 144b, meaning that no other partitions 144a-n may read from or write to such space. In some cases, the size of memory block may not change dynamically; it may be defined at the time when a configuration request 212 is received by at least a processor 108 from first partition 144a. As a nonlimiting example, the size of private static memory space may remain constant throughout a second partition 144b's lifecycle. Additionally, and/or alternatively, hypervisor 148 may read partition policy 216 upon system initialization or when a request to create a new partition 144a-n is received. Hypervisor 148 may then configure hardware resources through virtualization layer according to partition policy 216. As a nonlimiting example, partition policy 216 may include a default partition policy 216 specifying that a partition 144a-n should have at least 256 MB of RAM and 10 ms of CPU time every 100 ms to perform its intended function or functions. In one or more embodiments, memory 112 may be partitioned into a root partition 144a-n (also known as a parent partition) and one or more child partitions 144a-n. In some cases, only root partition 144a-n may include a host OS.

With continued reference to FIG. 2, in one or more embodiments, at least a processor 108 may be configured to integrate a software module 240 into virtual environment 140, using pre-defined operational rule 224. This step may be done by instantiating, within second partition 144b, software image 220 into at least one container 244, wherein the at least one container 244 includes a non-preemptible container runtime 260. For the purposes of this disclosure, a "software module" is a distinct unit of software that includes one or more computer programs designed to perform at least one particular function or a set of functions. In some cases, such functions may be provided by at least one operational rule 224. In some cases, a software module 240 may interact with other components via one or more interfaces (e.g., APIs). In one or more embodiments, a software module 240 may be designed to be reusable and to provide certain functionality that may be integrated into one or more different operating systems or larger software applications. As a nonlimiting example, at least one operational rule 224 may include a series of rules or polices that dictate how a software module 240 interacts with the system and/or the users, which may include, without limitation, how to utilize computational resources, how it is executed, and/or the like. As another nonlimiting example, in an SCOE, such as an avionics system as described herein, at least one operational rule 224 may ensure that a software module 240 does not interfere with any operation of other system components, e.g., partitions 144*a-n*, within virtual environment 140. A software module 240 may use dedicated system resources, e.g., dedicated execution time slice 228, private static memory space 232, or one or more other functionalities or services provided by other partitions 144*a-n* within virtual environments 140, such as a plurality of third partitions 144*c*, in a way that does not degrade system performance, and that software module 240 may run within certain safety and security measurements, as described in detail below.

With continued reference to FIG. 2, for the purposes of this disclosure, a "container" is an executable package of software image 220 that includes all necessary elements needed to run it in any SOE. As a nonlimiting example, at least a container 244 may include code, runtime, system tools, system libraries, configurations, and/or the like. In some cases, at least a container 244 may provide a "second layer" isolation or protection from virtual environment 140 and other containers 244 and/or partitions 144*a-n*. In one or more embodiments, at least a container 244 may include a standard unit of software that packages up code and all its dependencies so an integrated software module 240 may run under a desired performance from one SOE to another. In some cases, at least one container 244 may be created based on a software image 220 as described above. As a nonlimiting example, first partition 144*a* may include a container manager 248. For the purposes of this disclosure, a "container manager" is a component used to manage and/or orchestrate a plurality of containers 244. In some cases, each partition 144*a-n* of plurality of partitions 144*a-n*, especially in second partition 144*b*, may include a containerized application environment. In some cases, container manager 248 may be configured to create and further deploy one or more containers 244 on second partition 144*b*. In some cases, a plurality of containers 244 may be run simultaneously. In one or more embodiments, a container manager 248 may include an engine that provide at least an operating system e.g., CentOS, Debian, Fedora, RHEL, Ubuntu, Windows, MacOS, and/or the like, wherein the engine may enable one or more containers 244 to run in any partition 144*a-n* or virtual environment 140 consistently. In some cases, a container manager 248 may be configured to validate the authenticity of software images 220, load container executables into container environments, connect container environments to operating service, and/or export management APIs to other system management tools. In some cases, each partition 144*a-n* may include a container manager 248, and a plurality of container managers 248 of a plurality of partitions 144*a-n* may be (indirectly) communicative with each other. In some cases, a container manager 248 at second partition 144*b* and/or third partition 144*c* may be known as "container agent". As a nonlimiting example, software image 220 may become a container 244 at runtime-when it is running on a container agent.

With continued reference to FIG. 2, for the purposes of this disclosure, a "non-preemptible container runtime" is a runtime that cannot be interrupted or preempted by another processor 108 once at least one container 244 is up and running. In some cases, where at least one container 244 is running at a RTOS, a certain level of service or response time may be guaranteed. As a nonlimiting example, at least one container 244 may be granted access to at least a processor 108, memory 112, and other resources, as described above, according to partition policy 216 based on its priority. Once a software module 240 is running, it may have exclusive access to dedicated resources until it completes execution or a reaches a conclusion of dedicated execution time slice 228, as described above. As a nonlimiting example, at least one operational rule 224 of software image 220 may specify one or more safety-critical tasks which must not be delayed or interrupted by other non-critical tasks running on other partitions 144*a-n*. Exemplary embodiments of at least one container 244 may include a DOCKER container that encapsulate any payload and dependencies into a single object, a RTOS container, a safety-certified container designed to meet stringent certification requirements of regulatory bodies such as, without limitation, FAA or EASA, among others. As a nonlimiting example, software image 220 may capture an FMS module, wherein the FMS module may be configured to perform critical functions related to navigation and flight planning defined by its operational rule 224. Such FMS module may be instantiated within a container in second partition 144*b* and run with a non-preemptible runtime to ensure that navigation calculations and related data processing are not interrupted to maintain safety of flight operations.

With continued reference to FIG. 2, in one or more embodiments, instantiating software image 220 into at least one container 244 may include extracting software metadata 252 from software image 220. Software metadata 252 may include a plurality of software configuration parameters 256 and a plurality of digital files 264. For the purposes of this disclosure, "software metadata" is information related to software image 220. As a nonlimiting example, software metadata 252 may include a manifest file specifying a software version number, required dependencies, configurations, and/or the like. For the purposes of this disclosure, "software configuration parameters" are parameters that dictate how software image 220 should be set up within a particular SOE. Exemplary software configuration parameters 256 may include without limitation one or more environment variables, service endpoints, port numbers, paths to necessary libraries or dependencies, and/or other configuration data that may be necessary for a software module 240 to run correctly within second partition 144*b*. In some cases, at least a processor 108 may configure a container manager 248 within first partition 144*a*, through virtualization layer 208, to initialize at least one container 244 within second partition 144*b*, as a function of a plurality of software configuration parameters 256 by preparing container environment, i.e., non-preemptible container runtime 260, based on the one or more software configuration parameters 256. This step may be done, for example and without limitation, by setting up correct file paths, configuring virtual network settings, installing required libraries, and/or the like, based on a plurality of software configuration parameters 256. Integrating software module 240 may further include deploying a plurality of digital files 264 within the initialized container 244. For the purposes of this disclosure, "digital files" are a set of files each containing at least a portion of at least one operational rule 224. In some cases, a plurality of digital files 264 may include any files that are necessary for the operation of an integrated software module 240. As a nonlimiting example, plurality of digital files 264 may include one or more executable files, libraries, scripts, certificates for securities, data files, and/or the like. Container manager 248 may place plurality of digital files 264 in correct directories, setting permission, and/or prepare container agent to execute plurality of digital files. In some cases, container agent may load at least one operational rule 224 into a non-preemptible container runtime 260. As a nonlimiting example, at least one operational rule 224 may govern how a software image 220 may operate within at least one container 244 and second partition 144b, e.g., interaction with other software applications, utilization of dedicated resources, and/or response to certain events, among others.

With continued reference to FIG. 2, in some cases, second partition 144b may include a third-party application with a proprietary runtime environment. For the purposes of this disclosure, a "third-party application" is a software application developed by an entity other than a primary system vendor or integrator. In some cases, third-party applications may include additional, potentially non-essential functions and may not be part of a core system software. In some cases, a third-party application may require a specific runtime environment to function, also known as the "proprietary runtime environment". In some cases, a proprietary runtime environment may include one or more libraries, services, and/or other dependencies that are unique to applications and not necessarily shared with other parts of the system. In one or more embodiments, a proprietary runtime environment may operate within second partition 144b and may be prevented from interfering with the runtime environment of other partitions 144a-n. In some cases, proprietary runtime environment may be provided by at least one container 244. As a nonlimiting example, primary control system may operate in first partition 144a while in-flight entertainment applications (i.e., third-party application with its proprietary runtime) may operate in second partition 144b, which may be hosted in at least one container 244, given a dedicated set of resources and may only communicate with rest of system e.g., first partition 144a in predefined ways that do not jeopardize integrity or security of flight systems. In such embodiments, a hypervisor 148 may be configured to maintain strict isolation between partitions 144a-n while allowing necessary levels of communication for the system to function as a whole.

With continued reference to FIG. 2, in some cases, plurality of partitions 144a-n may include a plurality of third partitions 144c. For the purposes of this disclosure, a "third partition" is another isolated and encapsulated space within virtual environment 140 designed to run specific services. In some cases, services may include APIs, libraries calls, system calls, and/or other functionalities that may be required by second partition 144b and/or first partition 144a. In one or more embodiments, plurality of third partitions 144c may include one or more service VMs 156, wherein the service VMs 156 are dedicated VMs 156 (similar to first partition 144a and second partition 144b as described above) that runs background services necessary for the operation of system or integrated software module 240. In some cases, services may not interface directly with second partition 144b and/or its end-user. In some cases, services may also include monitoring, and other platform-level functions. In one or more embodiments, third partition 144c may include a platform service segment (PSS) 268. In some cases, PSS 268 may include a replica of PSSS as implemented in FACE, consistent with details described above. In some cases, PSS 268 may include at least one platform service that provides one or more core functionalities to a host OS or each non-preemptible container runtime 260, as described above. As a nonlimiting example, a PSS 268 may be configured as a fundamental layer of services upon which integrated software module 240 may rely. As a nonlimiting example, each third partition 144c of plurality of third partitions 144c may include a distinct program executive office (PEO) aviation service. In some cases, PEO aviation service may include one or more aspects tailored to support specific needs of army aviation, possibly including logistical service, communication service, navigation service, or the like. In some cases, each third partition 144c within a plurality of third partitions 144c may be isolated from each other i.e., each service running within its partition 144a-n cannot be compromised by activities in other partitions 144a-n, including without limitation second partition 144b. In other cases, service may further include hardware interfacing services, such as without limitation services communicating with sensors and actuators, to software services e.g., database management, network configuration, security services, and/or the like.

With continued reference to FIG. 2, in one or more embodiments, one or more third partitions 144c may together serve as an interface layer that allows different integrated software to communicate with each other. As a nonlimiting example, third partitions 144c may include APIs that allow integrated software to access platform services, e.g., databases, networking, hardware interfacing, and/or the like, as described above, without having to manage them directly. In one or more embodiments, one or more third partitions 144c may include libraries (i.e., collections of pre-written code that a software application can call upon to perform specific pre-configured tasks). As a nonlimiting example, third partitions 144c may include one or more cryptographic functions imported into the system for secure communications for second partition 144b. In one or more embodiments, a plurality of third partitions 144c may include one or more tools, such as without limitation compilers, debuggers, monitoring systems, or other software utilities, that support the development, deployment, and maintenance of software image 220 in second partition 144b. In one or more embodiments, a third partition 144c may be configured as a middleware that lies between first partition 144a and second partition 144c, providing services to integrated software module 240 beyond those available from first partition 144a. As a nonlimiting example, a third partition 144c as a middleware may handle services such as message queuing, transaction management, and/or coordination of distributed systems, among others. In such embodiments, a third partition 144c may act as a facilitator for communication and data management for second partition 144b. In some cases, a plurality of third partitions 144c may work as a "back-end system" for second partition 144b and/or first partition 144a, which may be "front-end" where users or operational interactions occurs. In some other cases, a first partition 144a may include a brokerage service for integrated software module 240, ensuring that data is passed correctly between different third partitions 144c. In some cases, a plurality of third partitions 144c may be built into virtual environment 140. As a nonlimiting example, when hypervisor 148 is being first instantiated, the hypervisor 148 may be configured to create one or more third partitions 144c according to pre-defined configurations. Specific services may be imported or exported as needed. Configuration request 212 may include a request for loading new services when software module 240 starts or becomes ready to run. In some cases, services within plurality of third partitions 144c may be updated through a secure update process that is tightly controlled by first partition 144a to prevent introduction of vulnerabilities or errors.

With continued reference to FIG. 2, at least a processor 108, in some cases where a multi-core processor is used, as described above, the multi-core processor may be configured to distribute the operation of first partition 144a to a first core of a plurality of cores and operate second partition 144b using a second core of the plurality of cores. In some cases, a first partition 144a, e.g., a management VM 156, may be assigned to operate on a first core, whereas a second partition 144b, e.g., an application VM 156, may be assigned to operate on second core. In some cases, both partitions 144a-n may be run in parallel without affecting the performance of any other partition 144a-n. In some cases, such hardware isolation may prevent faults in one partition 144a-n from affecting another, which is crucial in an SCOE. As a nonlimiting example, plurality of second partitions 144b may be distributed to a plurality of cores. In some cases, a second partition A may be configured to run a flight control system, while second partition B may be running non-critical tasks, e.g., in-flight entertainment, wherein the entertainment system may never interfere with flight controls. In some cases, at least a processor 108 may allocate different cores to different partitions 144a-n based on current load and performance requirement. In some cases, hypervisor 148 may be responsible for managing distribution of partitions 144a-n across a plurality of virtual cores through virtualization layer 208. In other cases, at least a processor 108 may employ core affinity settings, wherein certain tasks are "affined" or fixed to specific cores to prevent them from being shifted around, which may lead to variability in performance. Additionally, and/or alternatively, a plurality of third partitions 144c may also be configured to operate on a designated set of cores.

With continued reference to FIG. 2, in some cases, virtualization layer 208 may include a virtual bus 272. For the purposes of this disclosure, a "virtual bus" is a software construct that mimics the functionality of a physical bus. In one or more embodiments, an I/O virtual bus 272 may include a virtualization of I/O physical bus that facilitates communication between different components within virtual environment 140 or even different virtual environments 140. As a nonlimiting example, virtual bus 272 may connect a first partition 144a with a second partition 144b. In some cases, a management VM 156 (i.e., a first partition 144a) may send one or more administrative commands to a software module 240 (i.e., second partition 144b). Additionally, and/or alternatively, a virtual bus 272 may also connect first partition 144a with a plurality of third partitions 144c, allowing a management VM 156 to communicate with other ancillary and/or service-oriented partitions 144a-n, as described above. A virtual bus 272 may be set up in such a way that second partition 144b is isolated from direct communication with a plurality of third partitions 144c; this means that any communication to or from a software module 240 in the second partition 144b must go through first partition 144a. In this case, a software application running on second partition 144b may not be able to directly access or be accessed by one or more services or functions running on a plurality of third partitions 144c. As a nonlimiting example, a plurality of third partitions 144c may include various utility services e.g., logging, diagnostics, communication, backup services, among others, wherein virtual bus 272 may ensure that second partition 144 e.g., a flight navigation system, may only communicate with a controller, i.e., a management VM 156, and not directly with other utility services which may be less secure.

With continued reference to FIG. 2, in some cases, first partition 144 may include a logging mechanism 276. For the purposes of this disclosure, a "logging mechanism" is a system or process that systematically records events, transactions, and/or other significant observations, that occur within a software system. Such software system may include an integrated software module 240, e.g., a software image 220 with a non-preemptible container runtime 260. In some cases, a logging mechanism 276 may be integrated directly into a first partition 144a or any other partition 144a-n that may be responsible for system management; in other words, at least one third partition 144c of plurality of third partitions 144c may include an implementation of logging mechanism 276. In some cases, at least a processor 108 may implement a plurality of logging mechanisms 276, each of which may be designated to monitor a particular event or activity with a non-preemptible container runtime 260. In some cases, a logging mechanism 276 may include privileges to monitor all system activities in addition to those within the non-preemptible container runtime 260. In one or more embodiments, logging mechanism 276 may monitor second partition 144b through virtual bus 272, e.g., a communication channel that transmits data and events to be logged while maintaining isolation between partitions 144a-n within virtual environment 140. As a nonlimiting example, logging mechanisms 276 may be configured to log start and stop times (e.g., when container 244 or containers 244 begin and end execution), resource usage (e.g., CPU, memory, I/O usage), security events (e.g., any authentication attempts, access control violations, or any other security relevant events), errors (e.g., errors thrown by container 244 such as indicator of security concerns and operational issues), system calls (e.g., calls made from the container to host OS or from host OS to plurality of third partitions 144c), and/or the like. In some cases, data and event to be logged may be received from container manager 248. Container manager may be continuously or periodically monitoring other container agents in partitions 144a-n. As another nonlimiting example, logging mechanism 276 may be configured to record detailed operation data for post-flight analysis and incident investigation. In some cases, logging mechanism 276 may include a data logging PSSS implemented from PEO Aviation Enterprise Architecture (EA) and FAF v4.0 interfaces.

With continued reference to FIG. 2, in one or more embodiments, host circuit 204 may be configured to initiate a secure boot process when the system is powered on or restarted. In some cases, host circuit 204 may include a trusted platform module (TPM). For the purposes of this disclosure, a "trusted platform module" is a specialized chip on an endpoint hardware component or device that stores keys. Such keys may include, without limitation, cryptographic keys such as, without limitation encryption keys, decryption keys, public keys, private keys, or any key as described in this disclosure without limitation. As a nonlimiting example, host circuit 204 may include a plurality of TPMs, each containing an RSA key pair known as "Endorsement key (EK)", wherein the RSA key pair may be maintained inside of a TPM and cannot be accessed by software module 240 (i.e., second partition 144b). In some cases, first partition 144a may include a bootloader (i.e., the first piece of software that runs). In some cases, bootloader may be verified. As a nonlimiting example, one or more system firmware may be configured to check bootloader's digital signature before execution using keys, e.g., public keys stored in a TPM or another secure component. In case where a bootloader's signature doesn't match, host circuit 204 may halt, preventing potential malicious partitions 144*a-n* from running. Once bootloader is verified and executed, hypervisor 148 may be instantiated, as described above. In some cases, hypervisor 148 may also be verified through an associated digital signature to ensure its authenticity. As a nonlimiting example, host circuit 204 may boot only with trusted and authenticated partitions 144*a-n*, e.g., first partition 144*a* and/or plurality of third partitions 144*c*. Second partition 144*b* may be verified before loading, or trusted version of second partition 144*b* may be loaded. Hypervisor 148 may be configured to prevent any second partition 144*b* that yields a negative response during verification. In some cases, all events during the secure boot process, as described herein, including without limitation any verification failures or anomalies, can be communicated to first partition 144*a* through virtual bus 272 and logged by logging mechanism 276, as described above. In some cases, these events may be alerted to certain users, e.g., administrators. Additionally, or alternatively, in cases where verification fails, host circuit 204 may be configured to boot into a safe mode, attempting to restore a trusted software version, or simply halting at least a processor 108 and/or first partition 144*a* to prevent potential threats.

With continued reference to FIG. 2, for the purposes of this disclosure, a "digital signature" is a secure proof of possession of a secret by a signing device, as performed on a provided element of data, known as a "message". A message may include an encrypted mathematical representation of a file or other set of data using the private key of a public key cryptographic system. In some cases, a digital signature may be a secure proof. For the purposes of this disclosure, a "secure proof" is a protocol whereby an output is generated that demonstrates possession of a secret, such as a device-specific secret, without demonstrating the entirety of the device-specific secret; in other words, a secure proof by itself may be insufficient to reconstruct the entire device-specific secret, enabling the production of at least another secure proof using at least a device-specific secret. In some cases, a secure proof may be referred to as a "proof of possession" or "proof of knowledge" of a secret. Where at least a device-specific secret includes a plurality of secrets, such as a plurality of challenge-response pairs, a secure proof may include an output that reveals the entirety of one, but not all, of the plurality of secrets. As a nonlimiting example, a secure proof may include a response contained in one challenge-response pair. In one or more embodiments, proof may not be secure; in other words, a proof may include a one-time revelation of at least a device-specific secret, for instance as used in a single challenge-response exchange.

With continued reference to FIG. 2, in an embodiment, a secure proof may be implemented using a challenge-response protocol. In one or more embodiments, this may function as a one-time pad implementation. As a nonlimiting example, at least a processor 108 or first partition 144*a* may record a series of outputs ("responses") produced by a partition 144*a-n* possessing secret information, given a series of corresponding inputs ("challenges"), and store them securely. In one or more embodiments, a challenge-response protocol may be combined with key generation. A single key may be used in one or more digital signatures, such as without limitation signatures used to verify second partition 144*b*. The key may be discarded for future use after a set period of time. Secure proof may include encryption of a challenge to produce the response, indicating possession of a secret key. Encryption may be performed using a private key of a public key cryptographic system or using a private key of a symmetric cryptographic system. As a nonlimiting example, a first partition 144*a* may verify a response from a second partition 144*b* by decrypting an encryption of challenge or of another datum using either a symmetric or public-key cryptographic system, as described above, verifying that a stored key matches the key used for encryption as a function of at least a device-specific secret. Keys may be generated by random variation in selection of prime numbers, such as without limitation for the purposes of a cryptographic system, e.g., RSA, that relies prime factoring difficulty. Keys may be generated by randomized selection of parameters for a seed in a cryptographic system, such as elliptic curve cryptography, which is generated from a seed. Keys may be used to generate exponents for a cryptographic system, such as without limitation Diffie-Helman or ElGamal, that are based on a discrete logarithm problem.

With continued reference to FIG. 2, in some cases, a digital signature may be verified by first partition 144*a* and/or at least a processor 108, using a verification datum suitable for verification of a secure proof. As a nonlimiting example, where a secure proof is enacted by an encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to a possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as without limitation a hashing algorithm as described above. A mathematical representation to which a signature may be compared may be included with the signature, for verification purposes. In one or more embodiments, the algorithm used to produce the mathematical representation may be publicly available, permitting the easy reproduction of the mathematical representation corresponding to any file.

With continued reference to FIG. 2, in some embodiments, digital signatures may be combined with or incorporated in digital certificates. For the purposes of this disclosure, a "digital signature" is a file that conveys information and links the conveyed information to a "certificate authority (CA)" that is the issuer of a public key in a public key cryptographic system. In one or more embodiments, a certificate authority may contain data conveying the certificate authority's authorization for the recipient to perform a task. The authorization may include an authorization to access a given datum. The authorization may include an authorization to access a given process. In one or more embodiments, a digital certificate may identify certificate authority. A digital certificate may include a digital signature. In some embodiments, a third party, such as a certificate authority, may be available to verify that the possessor of the private key is indeed a particular entity; thus, if the certificate authority may be trusted, and the private key has not been stolen, the ability of an entity to produce a digital signature may confirm the identity of the entity and links the file to the entity in a verifiable way. A digital signature may be incorporated in a digital certificate. For the purposes of this disclosure, a "digital certificate" is a document authenticating an entity possessing a private key by authority of an issuing certificate authority and signed with a digital signature created with that private key and a mathematical representation of the remainder of the certificate. In other embodiments, a digital signature may be verified by comparing the digital signature to one known to have been created by the entity that purportedly signed the digital signature; for instance, if the public key that decrypts the known signature also decrypts the digital signature, the digital signature may be considered verified. A digital signature may also be used to verify that the file has not been altered since the formation of the digital signature.

With continued reference to FIG. 2, in some cases, second partition 144b and/or one or more third partition 144c may be hosted in a cloud environment, remote to virtual environment 140 and/or first partition 144a. In an embodiment, apparatus 100 may leverage cloud-native technologies or hybrid cloud models to enhance scalability. As a nonlimiting example, a dedicated set of resources configured to run a specific software, a container 244, and/or other services such as without limitation VMs 156, containers, cloud services, and/or the like, in cloud, e.g., AWS, MICROSOFT AZURE, and/or the like, may be analogues to second partition 144b as described herein. As a nonlimiting example, AWS EC2 may offer one or more computer abstractions from VMs 156 and/or containers 244 e.g., KUBERNETE. In such embodiments, a software module 240 may be deployed to cloud infrastructure. In one or more embodiments, Zero-Knowledge proof may allow a second partition 144b to prove to a first partition 144a that a given response, e.g., an execution of at least one operational rule 224, is true and authenticated. As a nonlimiting example, first partition 144a may perform one or more remote attestation protocols, e.g., TPM attestations, wherein an entity may prove to a remote entity that its components, e.g., firmware and/or software, is trustworthy without disclosing specific details about the response, operational rule 224, cryptographic keys, firmware, and/or software. In some cases, any sensitive or proprietary information related to second partition 144b may be verified to ensure it's running the correct software module 240 and hasn't been tampered with, all without revealing the specifics of such software module 240. As a nonlimiting example, first partition 144a may be configured to utilize KUBERNETES to automatically deploy and manage software module 240 in a cloud-based second partition 144b.

With continued reference to FIG. 2, for the purposes of this disclosure, a "zero-knowledge proof" is a proof or output that demonstrates a possession of a secret while revealing none of the secret to a recipient of the proof or output. A zero-knowledge proof may be information-theoretically secure, meaning that an entity with infinite computing power would be unable to determine secret from output. Alternatively, a zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P", which is used to prove computational integrity and/or possession of a secret, and a verifier algorithm, or "V", whereby an entity may check the validity of P. A zero-knowledge proof may include an interactive zero-knowledge proof, wherein an entity verifying the proof, e.g., via a verifying partition, must directly interact with the proving entity e.g., via a proving partition. As a nonlimiting example, the verifying and proving partitions may be required to be online or connected to the same network as each other at the same time. As a nonlimiting example, this may be enabled, at least in part, by a virtualization layer 208 and/or a virtual bus 272, as described above. In some cases, an interactive zero-knowledge proof may include a "proof of knowledge" proof, such as a Schnorr algorithm for proof on knowledge of a discrete logarithm. In a Schnorr algorithm, a prover may commit to a randomness, r, generate a message based on r, and generate a message adding r to a challenge c multiplied by a discrete logarithm that the prover is able to calculate. Verification is then performed by a verifier who may produce c by exponentiation, thus checking the validity of the discrete logarithm. An interactive zero-knowledge proof may alternatively, and/or additionally, include sigma protocols. A person of ordinary skill in the art, upon reviewing the entirety of this disclosure, will be aware of various alternative interactive zero-knowledge proofs that may be implemented consistently with this disclosure.

With continued reference to FIG. 2, alternatively, zero-knowledge proof may include a non-interactive zero-knowledge proof, or a proof wherein neither entity to the proof interacts with the other entity to the proof. As a nonlimiting example, a verifying partition receiving a proof and a proving partition providing the proof may receive a reference datum which the partition providing the proof may modify or otherwise use to perform the proof. As a nonlimiting example, a zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key. Suitable public key cryptographic system may include without limitation RSA, elliptic curve cryptography, ElGamal, or any other suitable public key cryptographic system. Generation of a trusted setup may be performed using a secure multiparty computation so that no one entity has control of the totality of the secret information used in the trusted setup. As a result, if any one partition generating the trusted setup is trustworthy, the secret information may be unrecoverable by malicious parties. As another nonlimiting example, a non-interactive zero-knowledge proof may include a Succinct Transparent Arguments of Knowledge (ZK-STARKS) zero-knowledge proof. In one or more embodiments, a ZK-STARKS proof may include a Merkle root of a Merkle tree representing evaluation of a secret computation at some number of points, which may be 1 billion points, plus Merkle branches representing evaluations at a set of randomly selected points of the number of points. Verification may include determining that provided Merkle branches match the Merkle root and that point verifications at those branches represent valid values, wherein validity may be shown by demonstrating that all values belong to the same polynomial created by transforming the secret computation. In one or more embodiments, ZK-STARKS may not require a trusted setup.

With continued reference to FIG. 2, a zero-knowledge proof may include any other suitable zero-knowledge proof. Suitable zero-knowledge proof may include, without limitation bulletproofs. Zero-knowledge proof may include without limitation a homomorphic public-key cryptography (hPKC)-based proof. Zero-knowledge proof may include without limitation a discrete logarithmic problem (DLP) proof. Zero-knowledge proof may include without limitation a secure multi-party computation (MPC) proof. Zero-knowledge proof may include without limitation an incrementally verifiable computation (IVC). Zero-knowledge proof may include without limitation an interactive oracle proof (IOP). Zero-knowledge proof may include without limitation a proof based on the probabilistically checkable proof (PCP) theorem, including a linear PCP (LPCP) proof. A person of ordinary skill in the art, upon reviewing the entirety of this disclosure, will be aware of various forms of zero-knowledge proofs that may be used, singly or in combination, consistently with this disclosure.

With continued reference to FIG. 2, additionally, or alternatively, first partition 144a may include a health manager 280. For the purposes of this disclosure, a "health manager" is a component that actively checks the state of various system components to ensure the overall system is functioning correctly. In some cases, health manager 280 may be implemented in a way tailored to fault management and recovery strategies. In some embodiments, health manager may be configured to continuously observe operational status of both hardware components (e.g., host circuit 204, at least a processor 108, sensors connected to the processor 108, memory 112, and/or the like) and software components (e.g., software module 240, plurality of third partitions 144c, host OS, and/or the like) and check integrity of data and software running within partitions 109a-c to ensure they are not corrupted or behaving erratically. In some cases, logging mechanism 276 may communicate with health manager 280 directly to record significant observations (e.g., recurring issues). In some cases, health manager 280 may perform one or more diagnostic checks to identify any potential issues. As a nonlimiting example, a health manager 280 may be configured to run self-tests or health checks at regular intervals or upon system boot-up. In some cases, diagnostic checks may be performed during secure boot, as described above. In one or more embodiments, health manager 280 may generate one or more alerts or warnings when it detects issues that may impact system performance and/or safety. In some cases, one or more pre-defined rules may be used to escalate issues to appropriate level of attention, potentially triggering failover and/or redundancy mechanisms, if necessary, wherein pre-defined rules may be stored in database or a third partition 144c, as described above. As a nonlimiting example, health manager 280 may include a real-time system health monitoring system configured to check operational readiness or one or more aircraft's avionics systems before takeoff and/or during flight, manage any in-flight anomalies, and support maintenance crew in identifying and resolving issue between flights. In some cases, health manager may include an aircraft system monitoring PCS, security event audit FACE PSSS, user authentication FACE PCS, operational mode management PCS, and/or the like implemented from PEO Aviation Enterprise Architecture (EA) and FAF v4.0 interfaces.

With continued reference to FIG. 2, at least a processor is configured to verify a compliance 284 of integrated software module 240 with a plurality of pre-determined safety standards 288. Such pre-determined safety standards 288 may be sourced from a trusted repository 292. This verification step may be implemented by monitoring an adherence of software module 240 to pre-defined operational rule 224 within non-preemptible container runtime 260 at first partition 144a. For the purposes of this disclosure, a "compliance" is a data element measuring a conformance of software module 240 to established guidelines or specifications. These guidelines or specifications are known as "safety standards" and are designed to ensure the safety and reliability of software module 240. Such compliance 284 may be especially important within environments where failure may lead to significant harm or loss. In some cases, compliance 284 may include a quantitative value such as a score or a range of scores. In other cases, compliance 284 may include one or more binary representation, for example, "1" and "0" or "TRUE" and "FALSE", wherein "1/TRUE" may indicate that a software module 240 is compliant with at least one corresponding safety standard, and "O/FALSE" may indicate that the software module 240 is non-compliant with the at least one corresponding safety standard. For the purposes of this disclosure, a "trusted repository" is a trusted entity wherein plurality of safety standards 288 are kept. Such trusted entity may include without limitation a secure storage and/or even a trusted (third) partition 144c. As a nonlimiting example, trust repository 292 may be considered authoritative and tamper-proof and may include without limitation one or more secure databases, version control systems, and/or certified data centers. In one or more embodiments, at least a processor 108 may be configured to evaluate compliance 284 to ensure that an integrated software module 240 may perform all functions specified by at least one operational rule 224. As a nonlimiting example, at least a processor 108 may be configured to determine a design assurance level (DAL) classification associated with an integrated software module 240 or a DAL classification based on container runtime behaviors observed by container agent, container manager 248, health manager 280, and/or data record generated and managed by logging mechanism 276 (in real-time or near real-time).

With continued reference to FIG. 2, for the purposes of this disclosure, a "design assurance level (DAL) classification" is a labelling process within a software based on the effects caused by a failure of a software module 240. For example, and without limitation, a software failure associated with a first software module which can potentially put human lives at risk may receive a particular classification, whereas a software failure associated with a second software module which may, at most, slightly injure an individual may be given a differing classification. In one or more embodiments, each integrated software module may be associated with a particular DAL. DAL classification may range from A-E; a DAL-A classification may indicate that software module 240 may cause death during failure, whereas as a DAL-E classification may indicate that there is no potential harm in the event of a software failure. In one or more embodiments, various software modules may be given classifications based on their inherent risk to cause harm to individuals. In one or more embodiments, the DAL of a software may indicate that one software module may require more frequent testing, more stringent safety protocols, and/or the like, in comparison to other software modules. As a nonlimiting example, a DAL-E classified software module may not require frequent testing as failure may not harm individuals, whereas a DAL-A classified software may require stringent testing to ensure that failure does not occur. In one or more embodiments, each DAL classification may contain minimum resource requirements such as without limitation minimum processing power, minimum space allocation, and/or the like. As a nonlimiting example, compliance 284 of software module 240 may be derived, at least in part, from determined DAL classification. In one or more embodiments, software data may contain DAL certification of at least one container 244.

With continued reference to FIG. 2, in some cases, compliance 284 may include an assessment of software module 240 regarding its conformance to at least one operational rule 224 that dictates the behavior of the software module 240, known as the "adherence". As a nonlimiting example, at least one operational rule 224 may dictate how it must perform under various conditions to be considered compliant. As a nonlimiting example, at least a processor 108 may be configured to verify the execution of software module 240. In some cases, at least a processor 108 may assign a high score to a software module 240 which executed without interference, e.g., functions within its runtime without being interrupted or influenced by other processes or partitions 144a-n, maintaining strict timing and performance as per its safety standards. In another nonlimiting example, at least a processor 108 may be configured to check the integrity of data processed, e.g., software metadata 252 and/or data transmitted by software module 240 using one or more error-checking algorithm or secure data transmission protocols. In some cases, compliance 284 may include DO-178C for avionics, ISO 26262 for automotive safety, IEC 61508 for industrial system safety, and/or the like. In some cases, a high compliance 284 may indicate that a software module 240 adheres to standards, e.g., RTCA/DO-178C for software in airborne systems. In some cases, compliance 284 may include a certification of ISO 27001. As a nonlimiting example, a software module 240 such as a flight control system software may be rigorously tested and verified against DO-178C standard based on observed runtime behaviors through simulation and/or in-flight testing.

With continued reference to FIG. 2, in some cases, first partition 144a or at least a third partition of plurality of third partitions 144 may include a dedicated verification module implementing one or more compliance algorithms, configured as a "watchdog", that continuously monitors the adherence of software module 240 to assess compliance 284. In some cases, verification module may have access to trusted repository 292 containing plurality of pre-defined safety standards 288, which may include without limitation DO-178C for software in airborne systems, ISO26262 for automotive safety, DO-297 for supply chain management, and/or the like. In some cases, verification module may be configured to compare non-preemptible container runtime behavior against one or more above listed pre-defined safety standards in real-time; for instance, and without limitation, this may include checking for correct execution of operational rule 224, proper use of system resources such as dedicated execution time slice 228, private static memory space 232, and/or the like, adherence to security protocols, among others. As a nonlimiting example, verification module may communicate with health manager 280 and/or logging mechanism 276 to monitor a wealth of data recorded. In some cases, verification module may be configured to analyze (e.g., using statistical methods or one or more machine-learning algorithms as described herein) to detect any deviations from expected behaviors as defined by one or more safety standards 288. As a nonlimiting example, verification module may include one or more machine-learning models. Additionally, and/or alternatively, one or more machine-learning models may be trained to predict expected runtime behaviors and/or detect anomalies indicating potential compliance issue. Additionally, or alternatively, a signature-based verification may be employed by verification module, which may use signatures or models created based on compliant behaviors against actual operational data and/or software metadata 252.

With continued reference to FIG. 2, in some cases, virtual environment 140 may further include or otherwise implement a software-defined intelligent network (SDIN). For the purposes of this disclosure, "Software Defined Intelligent Networking (SDIN)" is an advanced approach to network management that combines the principles of Software-Defined Networking (SDN) with intelligent technologies including without limitation artificial intelligence (AI) and machine learning (ML). The primary goal of SDIN is to enhance the control, automation, and optimization of network infrastructure by making it more dynamic, adaptable, and intelligent. It enables real-time analysis, proactive management, and dynamic optimization, making networks more efficient, reliable, and secure. This approach may be particularly useful in environments where flexibility, scalability, and performance optimization are critical, such as without limitation telecommunications, cloud computing, and IoT systems. For the purposes of this disclosure, "Software-Defined Networking (SDN)" is a network architecture approach that separates the control plane that makes decisions about where traffic is sent from the data plane that forwards traffic to the selected destination. This separation allows for centralized control and dynamic management of network resources through software, making the network more flexible, programmable, and adaptable to changing needs.

With continued reference to FIG. 2, in one or more embodiments, an SDIN may be a "smart" networking layer that may dynamically manage the connectivity and data flow between different system components, applications, partitions, and/or the like, based on certain criteria. Such criteria may include without limitation compliance 284 of integrated software module 240. In some cases, SDIN may include a network controller that controls communication between a plurality of partitions 144a-n within virtual environment 140 through virtualization layer 208 and/or hypervisor 148. In some cases, an SDIN may dynamically alter the connectivity between system components based on predefined rules, operational requirements, and/or real-time assessments such as compliance 284. In some cases, an SDIN may be configured to enforce one or more network polices that dictate how partitions 144a-n may interact, what bandwidth may be allocated, which partitions 144a-n may be permitted to communicate, and/or the like. In some cases, SDIN may communicate with container manager 248 that continuously monitors the activity of each partition 144a-n, and adjust connections between a plurality of partitions 144a-n. In some cases, adjusting connections between plurality of partitions may be based on a compliance matrix, as described in detail above. As a nonlimiting example, a network controller may be configured to selectively connect and/or disconnect partitions 144a-n as a function of a compliance matrix (e.g., compliance status). If a second partition 144b is found to be non-compliant with one or more safety standards 288, a network controller of SDIN may selectively disconnect or isolate the second partition 144b from the rest of system to prevent potential harm or interference with compliant partitions 144a-n (e.g., first partition 144a and plurality of third partitions 144c). In some cases, adjustments of connectivity may include reconfiguring and/or updating second partition 144b to bring it back to compliance before restoring its connectivity. This step may be implemented, for example and without limitation, through one or more rollback operations which may return second partition 144b to a previous compliant state.

With continued reference to FIG. 2, in one or more embodiments, an SDIN may employ a machine-learning module which may implement one or more machine-learning algorithms to predict and respond to network needs, detect anomalies that may indicate non-compliance, and/or automatically reconfigure connections for desired performance and safety, etc., consistent with details described elsewhere in this disclosure. As a nonlimiting example, one or more machine-learning models may be generated by a machine-learning module within an SDIN to predict potential compliance violations and proactively adjust connections before actual violations occur. In some cases, when a second partition 144b becomes non-compliant, an SDIN may automatically initiate procedure to bring it back into compliance, such as without limitation by triggering a security scan for vulnerabilities, or via a configuration update as described above. As a nonlimiting example, in an avionics system designed with modular architecture as described herein, each second partition 144b of a plurality of second partitions 144b integrated into the system may perform a distinct function-navigation, communication, in-flight entertainment, weaponry, and/or the like. These partitions 144a-n may be interconnected by a virtual bus 272, as described above, wherein SDIN may have privileges to configure a hypervisor 148 to manage virtual bus connection between a plurality of partitions 144a-n within virtual environment 140, through virtualization layer 208. During a routine check, SDIN may detect that in-flight entertainment system may be running outdated software that may have one or more vulnerabilities. In order to prevent any potential risk to aircraft's operations, an SDIN may be configured to immediately disconnect in-flight entertainment system so that it may no longer communicate with navigation or communication modules. In some cases, an SDIN may reroute passenger devices to a limited network that keeps them disconnected from main avionics but allows for basic functionality, such as without limitation internet browsing capabilities. In some cases, a machine-learning module may lean from historical incidents and update one or more predictive machine-learning models to better anticipate potential compliance lapses. In other cases, users, e.g., pilots, technicians, network administrators, passengers, and/or the like, may provide user feedback to support SDIN's decision making; for example, user may choose to trust or not to trust a software module 240. In some cases, a machine-learning module may adapt to user feedback to adjust the parameters therein, thereby reducing false positives or becoming more aligned with user expectations and expertise.

With continued reference to FIG. 2, additionally, or alternatively, an SDIN may be configured to direct traffic on a network. In contrast to hardware components such as routers, which may control a network through hardware, an SDIN may be used to dynamically control a network through an integrated software module 240. In one or more embodiments, SDIN may be used to control a network, wherein data packets may be routed using the SDIN. In one or more embodiments, an SDIN may act as an intermediary between a software application or software and a network, wherein the SDIN may control how a software module 240 interacts with the network. In some cases, an SDIN may be used to monitor and control network conditions. In one or more embodiments, an SDIN may be used to manage network resources for at least one container 244. In some cases, at least one container 244 may be limited in network resources due to their level of importance, such that a container 244 running a less important software image 220 does not crowd a network for less important matters. As a nonlimiting example, an SDIN may ensure an enablement of one or more dynamic mesh networks, and facilitate assured, secure data sharing across Link-16, BFT, 4586, and RAC2.

With continued reference to FIG. 2, in some embodiments, memory 112 may include one or more caches as described above, containing one or more cache entries. For the purposes of this disclosure, a "cache entry" is a single storage location within a cache. In some cases, each entry in cache may include actual data retrieved from main memory that at least a processor 108 may need again soon. In one or more embodiments, cache entry may include a part of a program code, or any data generated or required by integrated software module 240 or host OS that has been accessed recently. In some cases, a cache entry may include an address tag which is used to identify which data from main memory 112 is currently stored in the cache entry. As a nonlimiting example, when at least a processor 108 searches for data, it may be configured to check address tag to determine if the data is present in cache. In some cases, one or more control bits (i.e., flags that provide additional information about cache entry) such as without limitation whether data has been modified (i.e., dirty bit), whether the data is valid (i.e., valid bit), or if it has been recently accessed (e.g., used for replacement polices like Least Recently Used [LRU]). As a nonlimiting example, after second partition 144b's dedicated execution time slice 228 concludes, cache entries that may be used by second partition 144b may be cleared, ensuring any sensitive data is no longer accessible to any other partitions 144a-n or entity that may access same CPU core and cache thereafter. In some cases, at least a processor 108 may be configured to invalidate (i.e., clear) cache entries at the end of dedicated time slice 228. In some cases, invalidating one or more cache entries may include marking control bit of the cache entries as "invalid", so any subsequent attempts to access cache entries will result in a cache miss, preventing unauthorized access from other partitions 144a-n outside the process. As a nonlimiting example, once a critical navigation calculation is over, temporary computation results may be stored in cache. At least a processor 108 may be configured to ensure that such computation results can't be accessed by a third-party entity or other partitions 144a-n. Once an aircraft lands at its destination, cache entries may be automatically invalidated, returning cache to a clean state with no residual data from flight management system left.

Now referring to FIGS. 3A-B, exemplary partitioning designs 300a-b pertaining to apparatus 100 are illustrated. FIG. 3A illustrates a first partitioning design 300a, wherein an operating system 304a may sit atop the physical hardware of a computing device. In one or more embodiments, first operating system 304a may provide the means to partition and/or allocate memory within an operating system for use in one or more virtual machines 156. In one or more embodiments, first partitioning design 300a may allow for a single operating system to manage one or more partitions. In one or more embodiments, virtual machines 156 with first partitioning design 300a must rely on the dependability of host operating system 304a. In one or more embodiments, a type 2 hypervisor, as described above, may be used to create one or more virtual machines 156 atop operation system 304a. FIG. 3B illustrates a first partitioning design 300b, wherein one or more operating systems may communicate directly with physical hardware. In contrast to first partitioning design 300a wherein one or more virtual machines 156 must communicate with host operating system 304a to receive resources, second partitioning design 300b includes one or more virtual machines 156 that communicate directly with the physical hardware of a computing device. In one or more embodiments, a kernel 304b may allocate resources to each operating system. In one or more embodiments, a kernel 304b may create a virtualization layer, as described above, to generate virtualized devices and allocate the virtualized devices to each operating system. In one or more embodiments, a partition created using second partition design 300*b* may be independent of other operating systems operating on the computing device.

With continued reference to FIGS. 3A-B, in one or more embodiments, apparatus 100 may employ an approach of partitioning above a minimal kernel 304*b*, as shown in FIG. 3B, second partition design 300*b*. For the purposes of this disclosure, a "minimal kernel" is a core subset of an OS that provides only the most essential services required for basic operation. In some cases, minimal kernel 304*b* may be lightweight. As a nonlimiting example, minimal kernel 304*b* may be designed to have a minimal attack surface and reduced potential for bugs and errors. In some cases, at least processor 108 may be configured to create one or more isolated partitions e.g., first partition 144*a*, second partition 144*b*, third partition 144*c*, and/or virtual environment 140, on top of, or using the services of, minimal kernel 304*b*. As a nonlimiting example, one or more software applications and/or tasks (i.e., second partition 144*b*) may be partitioned according to partitioning designs 300*a-b* to ensure that these software applications and/or tasks do not interfere with each other, especially if they have different safety or security requirements. In some cases, when partitioning is done "above minimal kernel", each partition 144*a-n* of plurality of partitions 144*a-n* may run under a corresponding OS 308*a-c*, wherein each OS may be provided separately in each partition 144*a-n*. In these cases, plurality of partitions 144*a-n* may rely only on kernel 304*b* and its supporting hardware 312. Plurality of partitions 144*a-n* and their corresponding OS 308*a-c* may be separated by hypervisor 148 in consistent with SCOE design patterns as described above with reference to FIGS. 1-2. Each partition 144*a-n* of plurality of partitions 144*a-n* may have the ability to run a completely independent instance of an OS.

Figure 4:
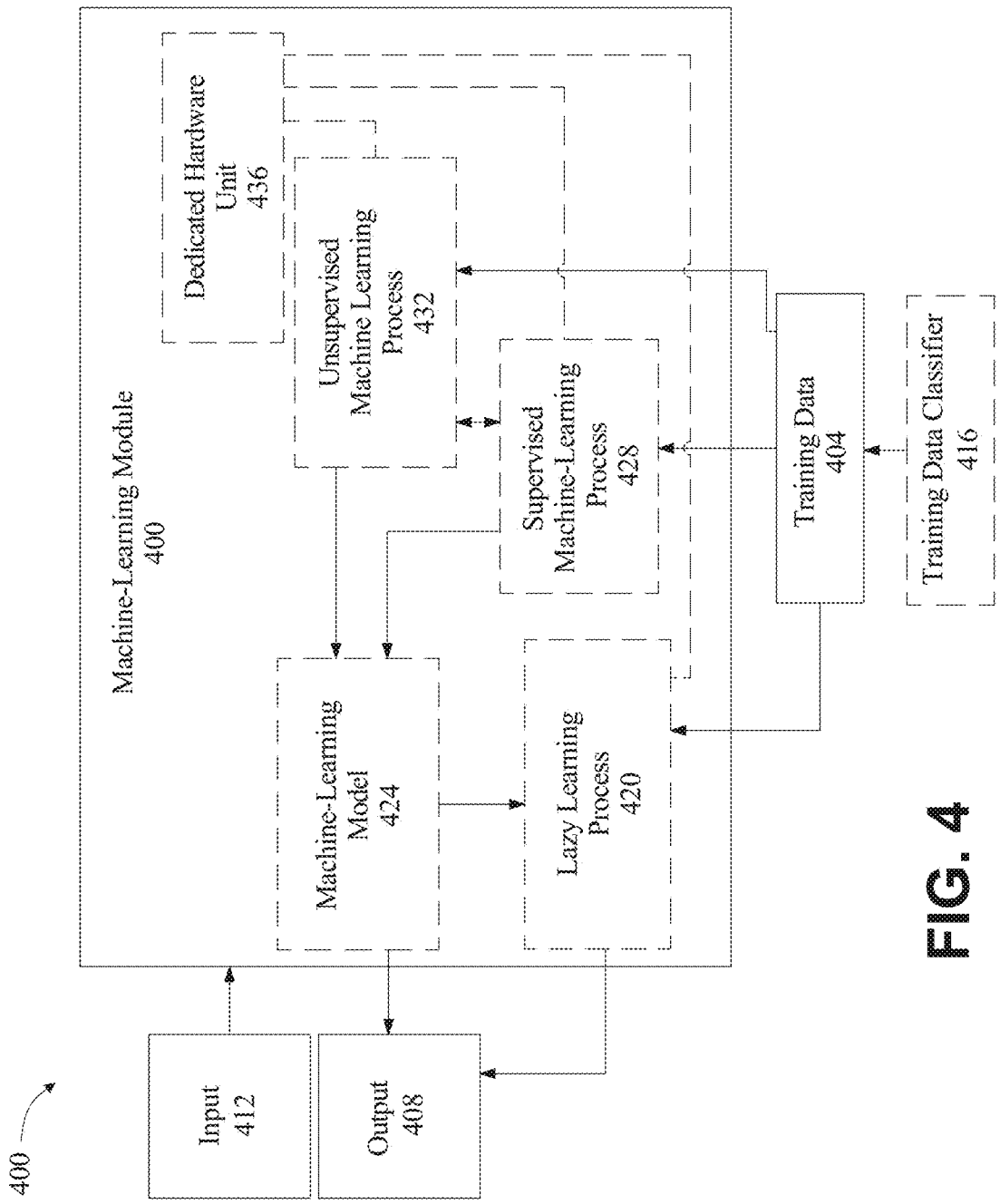
FIG. 4 is a block diagram of an exemplary embodiment of a machine-learning process.

Referring now to FIG. 4, an exemplary embodiment of a machine-learning module 400 that may perform one or more machine-learning processes as described above is illustrated. Machine-learning module may perform determinations, classification, and/or analysis steps, methods, processes, or the like as described in this disclosure using machine-learning processes. For the purposes of this disclosure, a "machine-learning process" is an automated process that uses training data 404 to generate an algorithm instantiated in hardware or software logic, data structures, and/or functions that will be performed by a computing device/module to produce outputs 408 given data provided as inputs 412. This is in contrast to a non-machine-learning software program where the commands to be executed are pre-determined by user and written in a programming language.

With continued reference to FIG. 4, "training data", for the purposes of this disclosure, are data containing correlations that a machine-learning process uses to model relationships between two or more categories of data elements. For instance, and without limitation, training data 404 may include a plurality of data entries, also known as "training examples", each entry representing a set of data elements that were recorded, received, and/or generated together. Data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a nonlimiting example, training data 404 may include data entered in standardized forms by persons or processes, such that entry of a given data element within a given field in a given form may be mapped to one or more descriptors of categories. Elements in training data 404 may be linked to descriptors of categories by tags, tokens, or other data elements. For instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

With continued reference to FIG. 4, alternatively, or additionally, training data 404 may include one or more elements that are uncategorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data, and the like; categories may be generated using correlation and/or other processing algorithms. As a nonlimiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a nonlimiting illustrative example, inputs may include exemplary group computing need, whereas outputs may include exemplary allocations.

With continued reference to FIG. 4, training data 404 may be filtered, sorted, and/or selected using one or more supervised and/or unsupervised machine-learning processes and/or models as described in further detail below; such processes and/or models may include without limitation a training data classifier 416. For the purposes of this disclosure, a "classifier" is a machine-learning model that sorts inputs into categories or bins of data, outputting the categories or bins of data and/or labels associated therewith. Machine-learning model may include without limitation a data structure representing and/or using a mathematical model, neural net, or a program generated by a machine-learning algorithm, known as a "classification algorithm". A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm. For the purposes of this disclosure, a "classification algorithm" is a process wherein a computing device and/or any module and/or component operating therein derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, Fisher's linear discriminant, quadratic classifiers, decision trees, boosted trees, random forest classifiers, learning vector quantization, and/or neural network-based classifiers. In one or more embodiments, training data classifier 416 may classify elements of training data to a plurality of cohorts as a function of certain features or traits.

With continued reference to FIG. 4, machine-learning module 400 may be configured to generate a classifier using a naive Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naive Bayes classification algorithm may be based on Bayes Theorem expressed as P(A/B)=P(B/A)×P(A)÷P(B), where P(A/B) is the probability of hypothesis A given data B, also known as posterior probability; P(B/A) is the probability of data B given that the hypothesis A was true; P(A) is the probability of hypothesis A being true regardless of data, also known as prior probability of A; and P(B) is the probability of the data regardless of the hypothesis. A naive Bayes algorithm may be generated by first transforming training data into a frequency table. Machine-learning module 400 may then calculate a likelihood table by calculating probabilities of different data entries and classification labels. Machine-learning module 400 may utilize a naive Bayes equation to calculate a posterior probability for each class. A class containing the highest posterior probability is the outcome of prediction. Naïve Bayes classification algorithm may include a gaussian model that follows a normal distribution. Naive Bayes classification algorithm may include a multinomial model that is used for discrete counts. Naive Bayes classification algorithm may include a Bernoulli model that may be utilized when vectors are binary.

With continued reference to FIG. 4, machine-learning module 400 may be configured to generate a classifier using a k-nearest neighbors (KNN) algorithm. For the purposes of this disclosure, a "k-nearest neighbors algorithm" is or at least includes a classification method that utilizes feature similarity to analyze how closely out-of-sample features resemble training data 404 and to classify input data to one or more clusters and/or categories of features as represented in training data 404. This may be performed by representing both training data 404 and input data in vector forms and using one or more measures of vector similarity to identify classifications within training data 404 and determine a classification of input data. K-nearest neighbors algorithm may include specifying a k-value, or a number directing the classifier to select the k most similar entries of training data 404 to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a nonlimiting example, an initial heuristic may include a ranking of associations between inputs 412 and elements of training data 404. Heuristic may include selecting some number of highest-ranking associations and/or training data elements.

With continued reference to FIG. 4, generating k-nearest neighbors algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least 2. Each value of n-tuple of values may represent a measurement or other quantitative value associated with a given category of data or attribute, examples of which are provided in further detail below. A vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent when their directions and/or relative quantities of values are the same; thus, as a nonlimiting example, a vector represented as [5, 10, 15] may be treated as equivalent, for the purposes of this disclosure, as a vector represented as [1, 2, 3]. Vectors may be more similar where their directions are more similar, and more different where their directions are more divergent. However, vector similarity may alternatively, or additionally, be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized", or divided by a "length" attribute, such as a length attribute I as derived using a Pythagorean norm:

$$l = \sqrt{\sum_{i=0}^{n} a_i^2},$$

where $\alpha_i$ is attribute number of vector i. Scaling and/or normalization may function to make vector comparison independent of absolute quantities of attributes, while preserving any dependency on similarity of attributes. This may, for instance, be advantageous where cases represented in training data 404 are represented by different quantities of samples, which may result in proportionally equivalent vectors with divergent values.

With continued reference to FIG. 4, training examples for use as training data may be selected from a population of potential examples according to cohorts relevant to an analytical problem to be solved, a classification task, or the like. Alternatively, or additionally, training data 404 may be selected to span a set of likely circumstances or inputs for a machine-learning model and/or process to encounter when deployed. For instance, and without limitation, for each category of input data to a machine-learning model and/or process that may exist in a range of values in a population of phenomena such as images, user data, process data, physical data, or the like, a computing device, processor 108, and/or machine-learning module 400 may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to user, so that a process can detect, automatically or via user input, one or more values that are not included in the set of training examples. Computing device, processor 108, and/or machine-learning module 400 may automatically generate a missing training example. This may be done by receiving and/or retrieving a missing input and/or output value and correlating the missing input and/or output value with a corresponding output and/or input value collocated in a data record with the retrieved value, provided by user, another device, or the like.

With continued reference to FIG. 4, computing device, processor 108, and/or machine-learning module 400 may be configured to preprocess training data 404. For the purposes of this disclosure, "preprocessing" training data is a process that transforms training data from a raw form to a format that can be used for training a machine-learning model. Preprocessing may include sanitizing, feature selection, feature scaling, data augmentation and the like.

With continued reference to FIG. 4, computing device, processor 108, and/or machine-learning module 400 may be configured to sanitize training data. For the purposes of this disclosure, "sanitizing" training data is a process whereby training examples that interfere with convergence of a machine-learning model and/or process are removed to yield a useful result. For instance, and without limitation, a training example may include an input and/or output value that is an outlier from typically encountered values, such that a machine-learning algorithm using the training example will be skewed to an unlikely range of input 412 and/or output 408; a value that is more than a threshold number of standard deviations away from an average, mean, or expected value, for instance, may be eliminated. Alternatively, or additionally, one or more training examples may be identified as having poor-quality data, where "poor-quality" means having a signal-to-noise ratio below a threshold value. In one or more embodiments, sanitizing training data may include steps such as removing duplicative or otherwise redundant data, interpolating missing data, correcting data errors, standardizing data, identifying outliers, and/or the like. In one or more embodiments, sanitizing training data may include algorithms that identify duplicate entries or spell-check algorithms.

With continued reference to FIG. 4, in one or more embodiments, images used to train an image classifier or other machine-learning model and/or process that takes images as inputs 412 or generates images as outputs 408 may be rejected if image quality is below a threshold value. For instance, and without limitation, computing device, processor 108, and/or machine-learning module 400 may perform blur detection. Elimination of one or more blurs may be performed, as a nonlimiting example, by taking Fourier transform or a Fast Fourier Transform (FFT) of image and analyzing a distribution of low and high frequencies in the resulting frequency-domain depiction of the image. Numbers of high-frequency values below a threshold level may indicate blurriness. As a further nonlimiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of image, based on the hypothesis that rapid changes indicate sharp edges in the image, and thus are indicative of a lower degree of blurriness. Blur detection may be performed using a wavelet-based operator, which uses coefficients of a discrete wavelet transform to describe the frequency and spatial content of images. Blur detection may be performed using statistics-based operators that take advantage of several image statistics as texture descriptors in order to compute a focus level. Blur detection may be performed by using discrete cosine transform (DCT) coefficients in order to compute a focus level of an image from its frequency content.

With continued reference to FIG. 4, computing device, processor 108, and/or machine-learning module 400 may be configured to precondition one or more training examples. For instance, and without limitation, where a machine-learning model and/or process has one or more inputs 412 and/or outputs 408 requiring, transmitting, or receiving a certain number of bits, samples, or other units of data, one or more elements of training examples to be used as or compared to inputs 412 and/or outputs 408 may be modified to have such a number of units of data. In one or more embodiments, computing device, processor 108, and/or machine-learning module 400 may convert a smaller number of units, such as in a low pixel count image, into a desired number of units by upsampling and interpolating. As a nonlimiting example, a low pixel count image may have 100 pixels, whereas a desired number of pixels may be 128. Processor 108 may interpolate the low pixel count image to convert 100 pixels into 128 pixels. It should also be noted that one of ordinary skill in the art, upon reading the entirety of this disclosure, would recognize the various methods to interpolate a smaller number of data units such as samples, pixels, bits, or the like to a desired number of such units. In one or more embodiments, a set of interpolation rules may be trained by sets of highly detailed inputs 412 and/or outputs 408 and corresponding inputs 412 and/or outputs 408 downsampled to smaller numbers of units, and a neural network or another machine-learning model that is trained to predict interpolated pixel values using the training data 404. As a nonlimiting example, a sample input 412 and/or output 408, such as a sample picture, with sample-expanded data units (e.g., pixels added between the original pixels) may be input to a neural network or machine-learning model and output a pseudo replica sample picture with dummy values assigned to pixels between the original pixels based on a set of interpolation rules. As a nonlimiting example, in the context of an image classifier, a machine-learning model may have a set of interpolation rules trained by sets of highly detailed images and images that have been downsampled to smaller numbers of pixels, and a neural network or other machine-learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, computing device, processor 108, and/or machine-learning module 400 may utilize sample expander methods, a low-pass filter, or both. For the purposes of this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor 108, and/or machine-learning module 400 may use averaging, such as luma or chroma averaging in images, to fill in data units in between original data units.

With continued reference to FIG. 4, in one or more embodiments, computing device, processor 108, and/or machine-learning module 400 may downsample elements of a training example to a desired lower number of data elements. As a nonlimiting example, a high pixel count image may contain 256 pixels, however a desired number of pixels may be 128. Processor 108 may downsample the high pixel count image to convert 256 pixels into 128 pixels. In one or more embodiments, processor 108 may be configured to perform downsampling on data. Downsampling, also known as decimation, may include removing every $N^{th}$ entry in a sequence of samples, all but every $N^{th}$ entry, or the like, which is a process known as "compression" and may be performed, for instance by an N-sample compressor implemented using hardware or software. Anti-aliasing and/or anti-imaging filters, and/or low-pass filters, may be used to eliminate side effects of compression.

With continued reference to FIG. 4, feature selection may include narrowing and/or filtering training data 404 to exclude features and/or elements, or training data including such elements that are not relevant to a purpose for which a trained machine-learning model and/or algorithm is being trained, and/or collection of features, elements, or training data including such elements based on relevance to or utility for an intended task or purpose for which a machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, wherein a difference between each value, X, and a minimum value, $X_{min}$, in a set or subset of values is divided by a range of values, $X_{max}-X_{min}$, in the set or subset $$X_{new} = \frac{X - X_{min}}{X_{max} - X_{min}}.$$

Feature scaling may include mean normalization, wherein a difference between each value, X, and a mean value of a set and/or subset of values, $X_{mean}$, is divided by a range of values, $X_{max}-X_{min}$, in the set or subset:

$$X_{new} = \frac{X - X_{mean}}{X_{max} - X_{min}}.$$

Feature scaling may include standardization, wherein a difference between X and $X_{mean}$ is divided by a standard deviation, o, of a set or subset of values:

$$X_{new} = \frac{X - X_{mean}}{\sigma}.$$

Feature scaling may be performed using a median value of a set or subset, $X_{median}$, and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

A Person of ordinary skill in the art, upon reviewing the entirety of this disclosure, will be aware of various alternative or additional approaches that may be used for feature scaling.

With continued reference to FIG. 4, computing device, processor 108, and/or machine-learning module 400 may be configured to perform one or more processes of data augmentation. For the purposes of this disclosure, "data augmentation" is a process that adds data to a training data 404 using elements and/or entries already in the dataset. Data augmentation may be accomplished, without limitation, using interpolation, generation of modified copies of existing entries and/or examples, and/or one or more generative artificial intelligence (AI) processes, for instance using deep neural networks and/or generative adversarial networks. Generative processes may be referred to alternatively in this context as "data synthesis" and as creating "synthetic data". Augmentation may include performing one or more transformations on data, such as geometric, color space, affine, brightness, cropping, and/or contrast transformations of images.

With continued reference to FIG. 4, machine-learning module 400 may be configured to perform a lazy learning process and/or protocol 420. For the purposes of this disclosure, a "lazy learning" process and/or protocol is a process whereby machine learning is conducted upon receipt of input 412 to be converted to output 408 by combining the input 412 and training data 404 to derive the algorithm to be used to produce the output 408 on demand. A lazy learning process may alternatively be referred to as a "lazy loading" or "call-when-needed" process and/or protocol. For instance, an initial set of simulations may be performed to cover an initial heuristic and/or "first guess" at an output 408 and/or relationship. As a nonlimiting example, an initial heuristic may include a ranking of associations between inputs 412 and elements of training data 404. Heuristic may include selecting some number of highest-ranking associations and/or training data 404 elements. Lazy learning may implement any suitable lazy learning algorithm, including without limitation a k-nearest neighbors algorithm, a lazy naive Bayes algorithm, or the like. A person of ordinary skill in the art, upon reviewing the entirety of this disclosure, will be aware of various lazy learning algorithms that may be applied to generate outputs as described in this disclosure, including, without limitation lazy learning applications of machine-learning algorithms as described in further detail below.

With continued reference to FIG. 4, alternatively, or additionally, machine-learning processes as described in this disclosure may be used to generate machine-learning models 424. A "machine-learning model", for the purposes of this disclosure, is a data structure representing and/or instantiating a mathematical and/or algorithmic representation of a relationship between inputs 412 and outputs 408, generated using any machine-learning process including without limitation any process described above, and stored in memory. An input 412 is submitted to a machine-learning model 424 once created, which generates an output 408 based on the relationship that was derived. For instance, and without limitation, a linear regression model, generated using a linear regression algorithm, may compute a linear combination of input data using coefficients derived during machine-learning processes to calculate an output datum. As a further nonlimiting example, a machine-learning model 424 may be generated by creating an artificial neural network, such as a convolutional neural network comprising an input layer of nodes, one or more intermediate layers, and an output layer of nodes. Connections between nodes may be created by "training" the network, in which elements from a training data 404 are applied to the input nodes, and a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning, as described in detail below.

With continued reference to FIG. 4, machine-learning module 400 may perform at least a supervised machine-learning process 428. For the purposes of this disclosure, a "supervised" machine-learning process is a process with algorithms that receive training data 404 relating one or more inputs 412 to one or more outputs 408, and seek to generate one or more data structures representing and/or instantiating one or more mathematical relations relating input 412 to output 408, where each of the one or more mathematical relations is optimal according to some criterion specified to the algorithm using some scoring function. For instance, a supervised learning algorithm may include inputs 412 described above as inputs, and outputs 408 described above as outputs, and a scoring function representing a desired form of relationship to be detected between inputs 412 and outputs 408. Scoring function may, for instance, seek to maximize the probability that a given input 412 and/or combination thereof is associated with a given output 408 to minimize the probability that a given input 412 is not associated with a given output 408. Scoring function may be expressed as a risk function representing an "expected loss" of an algorithm relating inputs 412 to outputs 408, where loss is computed as an error function representing a degree to which a prediction generated by the relation is incorrect when compared to a given input-output pair provided in training data 404. Supervised machine-learning processes may include classification algorithms as defined above. A person of ordinary skill in the art, upon reviewing the entirety of this disclosure, will be aware of various possible variations of at least a supervised machine-learning process 428 that may be used to determine a relation between inputs and outputs.

With continued reference to FIG. 4, training a supervised machine-learning process may include, without limitation, iteratively updating coefficients, biases, and weights based on an error function, expected loss, and/or risk function. For instance, an output 408 generated by a supervised machine-learning process 428 using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updates may be performed in neural networks using one or more back-propagation algorithms. Iterative and/or recursive updates to weights, biases, coefficients, or other parameters as described above may be performed until currently available training data 404 are exhausted and/or until a convergence test is passed. For the purposes of this disclosure, a "convergence test" is a test for a condition selected to indicate that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

With continued reference to FIG. 4, a computing device, processor 108, and/or machine-learning module 400 may be configured to perform method, method step, sequence of method steps, and/or algorithm described in reference to this figure, in any order and with any degree of repetition. For instance, computing device, processor 108, and/or machine-learning module 400 may be configured to perform a single step, sequence, and/or algorithm repeatedly until a desired or commanded outcome is achieved; repetition of a step or a sequence of steps may be performed iteratively and/or recursively using outputs 408 of previous repetitions as inputs 412 to subsequent repetitions, aggregating inputs 412 and/or outputs 408 of repetitions to produce an aggregate result, reduction or decrement of one or more variables such as global variables, and/or division of a larger processing task into a set of iteratively addressed smaller processing tasks. A computing device, processor 108, apparatus 100, or machine-learning module 400 may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. A person of ordinary skill in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 4, machine-learning process may include at least an unsupervised machine-learning process 432. For the purposes of this disclosure, an unsupervised machine-learning process is a process that derives inferences in datasets without regard to labels. As a result, an unsupervised machine-learning process 432 may be free to discover any structure, relationship, and/or correlation provided in the data. Unsupervised processes 432 may not require a response variable, may be used to find interesting patterns and/or inferences between variables, to determine a degree of correlation between two or more variables, or the like.

With continued reference to FIG. 4, machine-learning module 400 may be designed and configured to create machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include an elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to a person of ordinary skill in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought. Similar methods to those described above may be applied to minimize error functions, as will be apparent to a person of ordinary skill in the art upon reviewing the entirety of this disclosure.

With continued reference to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

With continued reference to FIG. 4, a machine-learning model and/or process may be deployed or instantiated by incorporation into a program, apparatus, system, and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit, to represent a number according to any suitable encoding system including twos complement or the like, or may be stored in any volatile and/or non-volatile memory. Similarly, mathematical operations and input 412 and/or output 408 of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation application-specific integrated circuits (ASICs), production and/or configuration of reconfigurable hardware elements, circuits, and/or modules such as without limitation field programmable gate arrays (FPGAs), production and/or configuration of non-reconfigurable and/or non-rewritable memory elements, circuits, and/or modules such as without limitation non-rewritable read-only memory (ROM), other memory technology described in this disclosure, and/or production and/or configuration of any computing device and/or component thereof as described in this disclosure. Such deployed and/or instantiated machine-learning model and/or algorithm may receive inputs 412 from any other process, module, and/or component described in this disclosure, and produce outputs 408 to any other process, module, and/or component described in this disclosure.

With continued reference to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively, or additionally, retraining, deployment, and/or instantiation may be event-based, and may be triggered, without limitation, by user inputs indicating sub-optimal or otherwise problematic performance and/or by automated field testing and/or auditing processes, which may compare outputs 408 of machine-learning models and/or algorithms, and/or errors and/or error functions thereof, to any thresholds, convergence tests, or the like, and/or may compare outputs 408 of processes described herein to similar thresholds, convergence tests or the like. Event-based retraining, deployment, and/or instantiation may alternatively, or additionally, be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data 404 may include, without limitation, training examples including inputs 412 and correlated outputs 408 used, received, and/or generated from any version of any system, module, machine-learning model or algorithm, apparatus, and/or method described in this disclosure. Such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs 408 for training processes as described above. Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

With continued reference to FIG. 4, one or more processes or algorithms described above may be performed by at least a dedicated hardware unit 436. For the purposes of this disclosure, a "dedicated hardware unit" is a hardware component, circuit, or the like, aside from a principal control circuit and/or processor 108 performing method steps as described in this disclosure, that is specifically designated or selected to perform one or more specific tasks and/or processes described in reference to this figure. Such specific tasks and/or processes may include without limitation preprocessing and/or sanitization of training data and/or training a machine-learning algorithm and/or model. Dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously, in parallel, and/or the like. Such dedicated hardware units 436 may include, without limitation, graphical processing units (GPUs), dedicated signal processing modules, field programmable gate arrays (FPGA), other reconfigurable hardware that has been configured to instantiate parallel processing units for one or more specific tasks, or the like. Computing device, processor 108, apparatus 100, or machine-learning module 400 may be configured to instruct one or more dedicated hardware units 436 to perform one or more operations described herein, such as evaluation of model and/or algorithm outputs, one-time or iterative updates to parameters, coefficients, weights, and/or biases, vector and/or matrix operations, and/or any other operations described in this disclosure.

Figure 5:
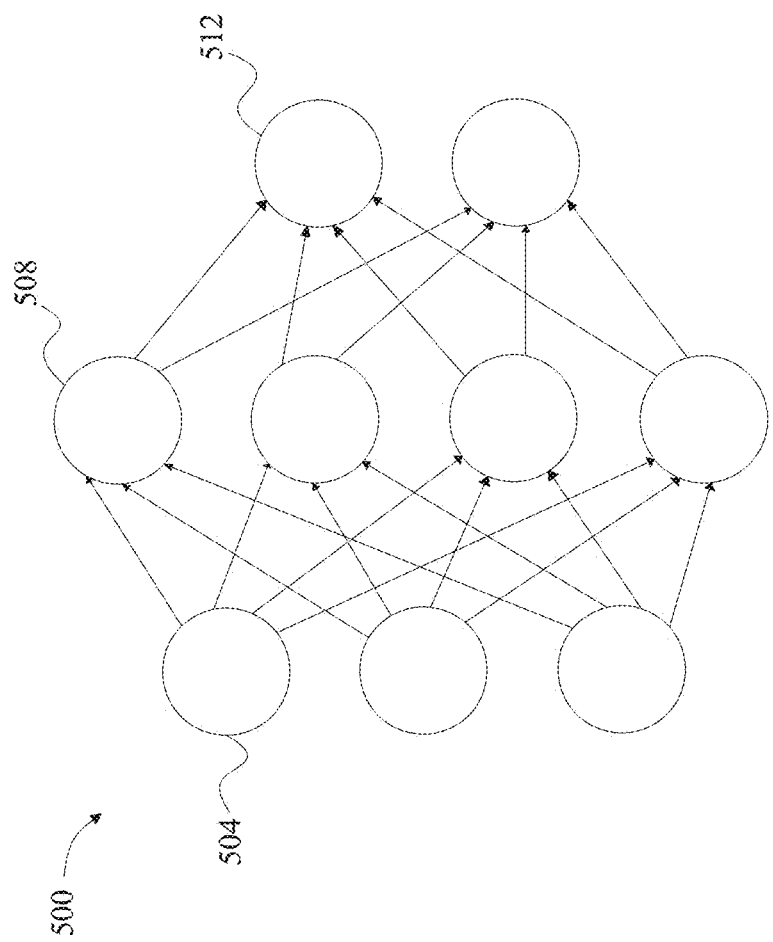
FIG. 5 is a block diagram of an exemplary embodiment of a neural network.

Referring now to FIG. 5, an exemplary embodiment of neural network 500 is illustrated. For the purposes of this disclosure, a neural network or artificial neural network is a network of "nodes" or data structures having one or more inputs, one or more outputs, and a function determining outputs based on inputs. Such nodes may be organized in a network, such as without limitation a convolutional neural network, including an input layer of nodes 504, at least an intermediate layer of nodes 508, and an output layer of nodes 512. Connections between nodes may be created via the process of "training" neural network 500, in which elements from a training dataset are applied to the input nodes, and a suitable training algorithm (such as Levenberg-Marquardt, conjugate gradient, simulated annealing, or other algorithms) is then used to adjust the connections and weights between nodes in adjacent layers of the neural network 500 to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network". As a further nonlimiting example, neural network 500 may include a convolutional neural network comprising an input layer of nodes 504, one or more intermediate layers of nodes 508, and an output layer of nodes 512. For the purposes of this disclosure, a "convolutional neural network" is a type of neural network 500 in which at least one hidden layer is a convolutional layer that convolves inputs to that layer with a subset of inputs known as a "kernel", along with one or more additional layers such as pooling layers, fully connected layers, and the like.

Figure 6:
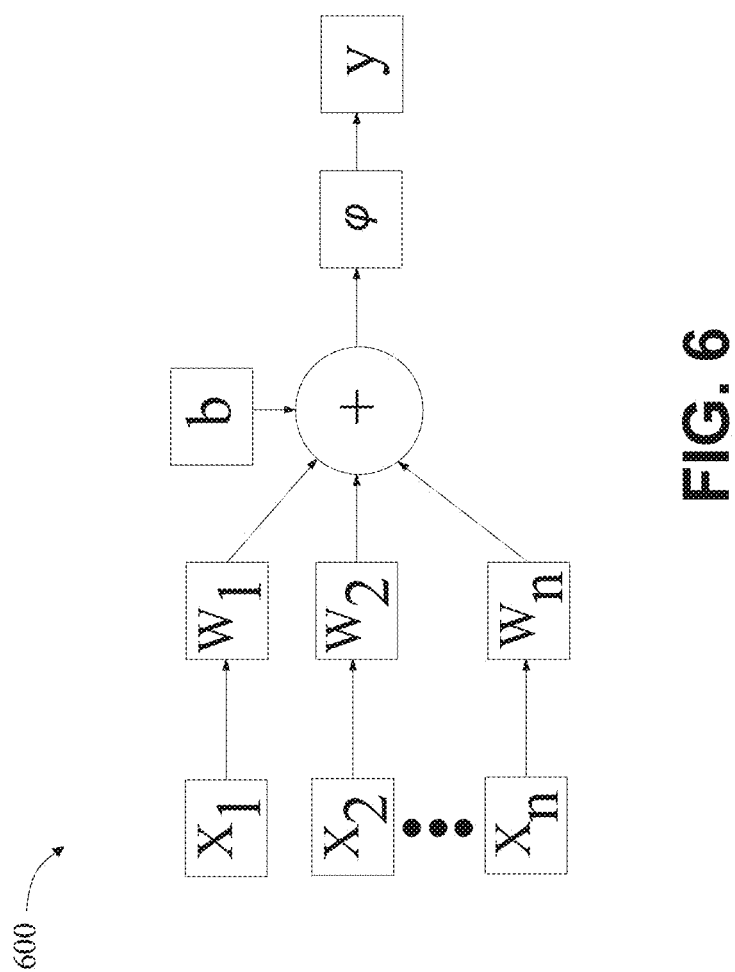
FIG. 6 is a block diagram of an exemplary embodiment of a node of a neural network.

Referring now to FIG. 6, an exemplary embodiment of a node 600 of neural network 500 is illustrated. Node 600 may include, without limitation, a plurality of inputs, $x_i$, that may receive numerical values from inputs to neural network 500 containing the node 600 and/or from other nodes 600. Node 600 may perform one or more activation functions to produce its output given one or more inputs, such as without limitation computing a binary step function comparing an input to a threshold value and outputting either a logic 1 or logic 0 output or its equivalent, a linear activation function whereby an output is directly proportional to input, and/or a nonlinear activation function wherein the output is not proportional to the input. Nonlinear activation functions may include, without limitation, a sigmoid function of the form $$f(x) = \frac{1}{1 - e^{-x}}$$

given input x, a tanh (hyperbolic tangent) function of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some value of a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$, that may be used as activation functions. As a nonlimiting and illustrative example, node 600 may perform a weighted sum of inputs using weights, $w_i$, that are multiplied by respective inputs, $x_i$. Additionally, or alternatively, a bias b may be added to the weighted sum of the inputs such that an offset is added to each unit in a neural network layer that is independent of the input to the layer. The weighted sum may then be input into a function, φ, which may generate one or more outputs, y. Weight, $w_i$, applied to an input, $x_i$, may indicate whether the input is "excitatory", indicating that it has strong influence on the one or more outputs, y, for instance by the corresponding weight having a large numerical value, or "inhibitory", indicating it has a weak influence on the one more outputs, y, for instance by the corresponding weight having a small numerical value. The values of weights, $w_i$, may be determined by training neural network 500 using training data, which may be performed using any suitable process as described above.

Figure 7:
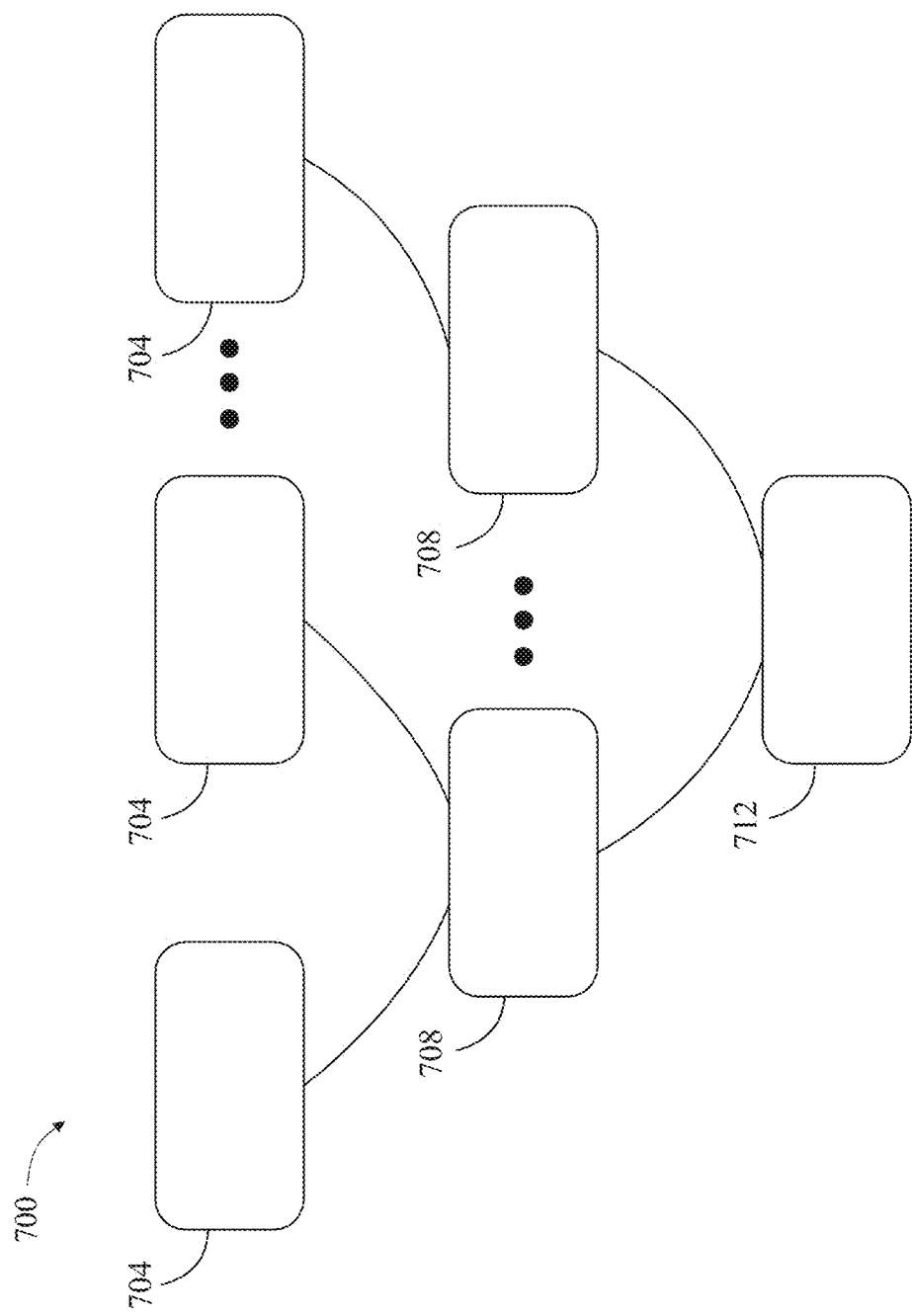
FIG. 7 is a block diagram of an exemplary embodiment of a cryptographic accumulator.

Referring now to FIG. 7, an exemplary embodiment of a cryptographic accumulator 700 is illustrated. For the purposes of this disclosure, a "cryptographic accumulator" is a data structure created by relating a commitment, which may be a smaller amount of data referred to as an "accumulator" and/or "root", to a set of elements, such as lots of data and/or collection of data, together with short membership and/or nonmembership proofs for any element in the set. In an embodiment, these proofs may be publicly verifiable against such commitment. An accumulator may be said to be "dynamic" if the commitment and membership proofs can be updated efficiently as elements are added or removed from the set, at a unit cost independent of the number of accumulated elements; an accumulator for which this is not the case may be referred to as "static". A membership proof may be referred to as a "witness" whereby an element existing in the larger amount of data can be shown to be included in the root, while an element not existing in the larger amount of data can be shown not to be included in the root. "Inclusion" indicates that the included element was a part of the process of generating the root and therefore was included in the original larger data set. Cryptographic accumulator 700 has a plurality of accumulated elements 704, each accumulated element 704 generated from a plurality of data lots. Accumulated elements 704 are created using an encryption process. For the purposes of this disclosure, an "encryption process" is a process that renders the lots of data unintelligible from the accumulated elements 704; this may be a one-way process such as a cryptographic hashing process or a reversible process such as encryption. Cryptographic accumulator 700 further includes structures and/or processes for conversion of accumulated elements 704 to root element, as described below. For instance, and as illustrated for exemplary purposes in FIG. 7, cryptographic accumulator 700 may be implemented as a Merkle tree and/or hash tree, in which each accumulated element 704 created by cryptographically hashing a lot of data. Two or more accumulated elements 704 may be hashed together in a further cryptographic hashing process to produce a node 708 element; a plurality of node 708 elements may be hashed together to form parent nodes, and ultimately a set of nodes 708 may be combined and cryptographically hashed to form root 712. Contents of root 712 may thus be determined by contents of nodes 708 used to generate root 712, and consequently by contents of accumulated elements 704, which are determined by contents of lots used to generate accumulated elements 704. As a result of collision resistance and avalanche effects of hashing algorithms, any change in any lot, accumulated element 704, and/or node 708 is virtually certain to cause a change in root 712; thus, it may be computationally infeasible to modify any element of Merkle and/or hash tree without the modification being detectable as generating a different root 712. In one or more embodiments, any accumulated element 704 and/or all intervening nodes 708 between accumulated element 704 and root 712 may be made available without revealing anything about a lot of data used to generate accumulated element 704; lot of data may be kept secret and/or demonstrated with a secure proof as described below, preventing any unauthorized party from acquiring data in lot.

With continued reference to FIG. 7, alternatively or additionally, cryptographic accumulator 700 may include a "vector commitment" which may act as an accumulator where an order of elements in set is preserved in its root 712 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). A person of ordinary skill in the art, upon reviewing the entirety of this disclosure, will be aware of various alternative or additional cryptographic accumulators 700 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e., given an input it is easy to produce an output of the one-way function, but given an output it is computationally infeasible and/or impossible to generate the input that produces the output via the one-way function. As an illustrative example, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further nonlimiting example, RSA and class group accumulators may be based on the fact that it is infeasible to compute an arbitrary root of an element in a cyclic group of unknown order, whereas arbitrary powers of elements are easy to compute. A data element may be added to accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point P needs to be added as many times to itself to result in Q as R needs to be added as many times to itself to result in S can be computed efficiently for certain elliptic curves.

Figure 8:
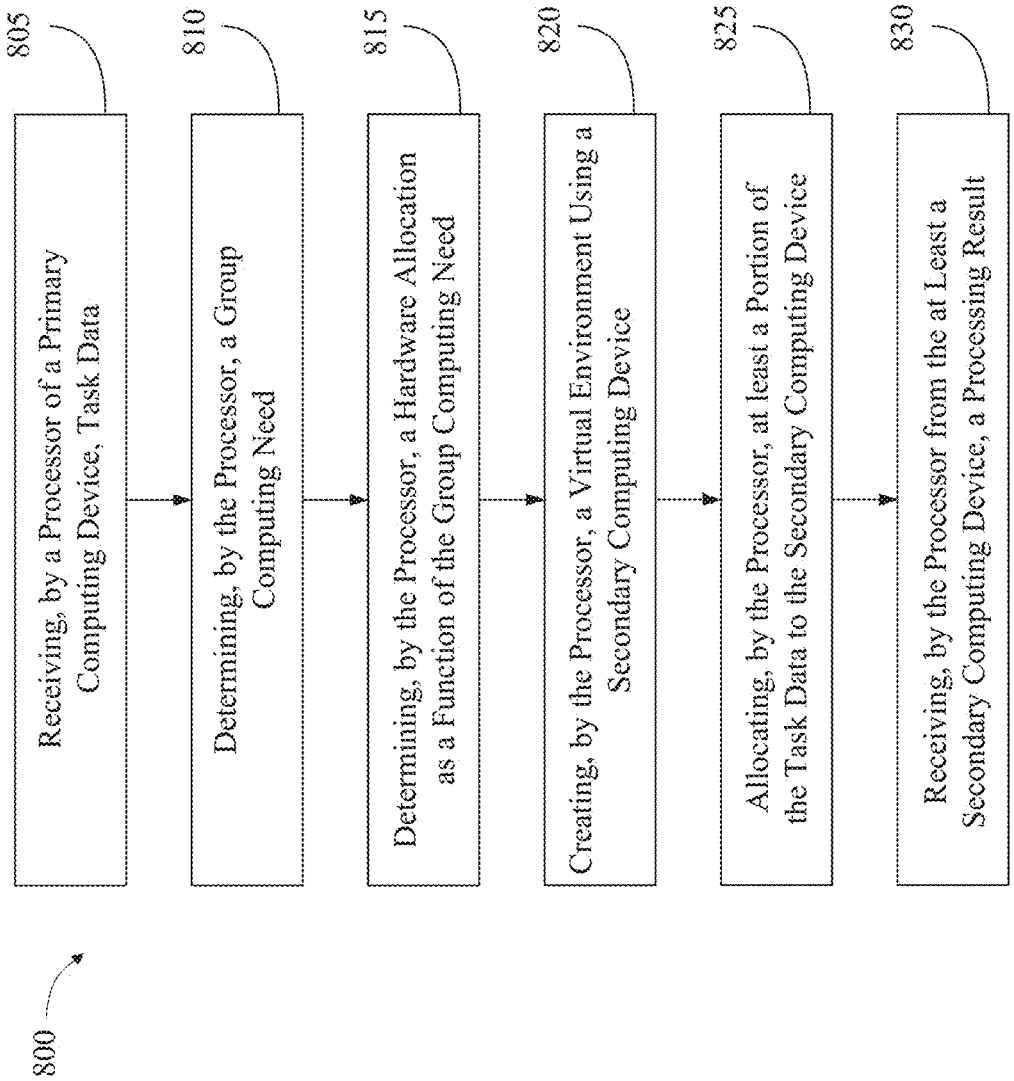
FIG. 8 is an exemplary flow diagram illustrating a method for performing group computing in a SCOE.

Referring now to FIG. 8, an exemplary embodiment of a method 800 for performing group computing in a safety-critical operating environment (SCOE) is described. At step 805, method 800 includes receiving, by at least a processor 108 of primary computing device 104, task data 116. This step may be implemented with reference to details described above in this disclosure and without limitation.

With continued reference to FIG. 8, at step 810, method 800 includes determining, by at least a processor 108, group computing need 120, wherein determining the group computing need 120 includes comparing task data 116 against preset group computing criterion 128 and determining the group computing need 120 as a function of the comparison. This step may be implemented with reference to details described above in this disclosure and without limitation.

With continued reference to FIG. 8, at step 815, method 800 includes determining, by at least a processor 108, a hardware allocation 136 as a function of group computing need 120. This step may be implemented with reference to details described above in this disclosure and without limitation.

With continued reference to FIG. 8, at step 820, method 800 includes creating, by at least a processor 108, virtual environment 140 using at least a secondary computing device 124 communicatively connected to primary computing device 104, as a function of hardware allocation 136. This step may be implemented with reference to details described above in this disclosure and without limitation.

With continued reference to FIG. 8, at step 825, method 800 includes allocating, by at least a processor 108, at least a portion of task data 116 to at least a secondary computing device 124, as a function of group computing need 120, wherein the at least a portion of the task data 116 is executed by the at least a secondary computing device 124. This step may be implemented with reference to details described above in this disclosure and without limitation.

With continued reference to FIG. 8, at step 825, method 800 includes receiving, by at least a processor 108 from at least a secondary computing device 124, processing result 172. This step may be implemented with reference to details described above in this disclosure and without limitation.

Figure 9:
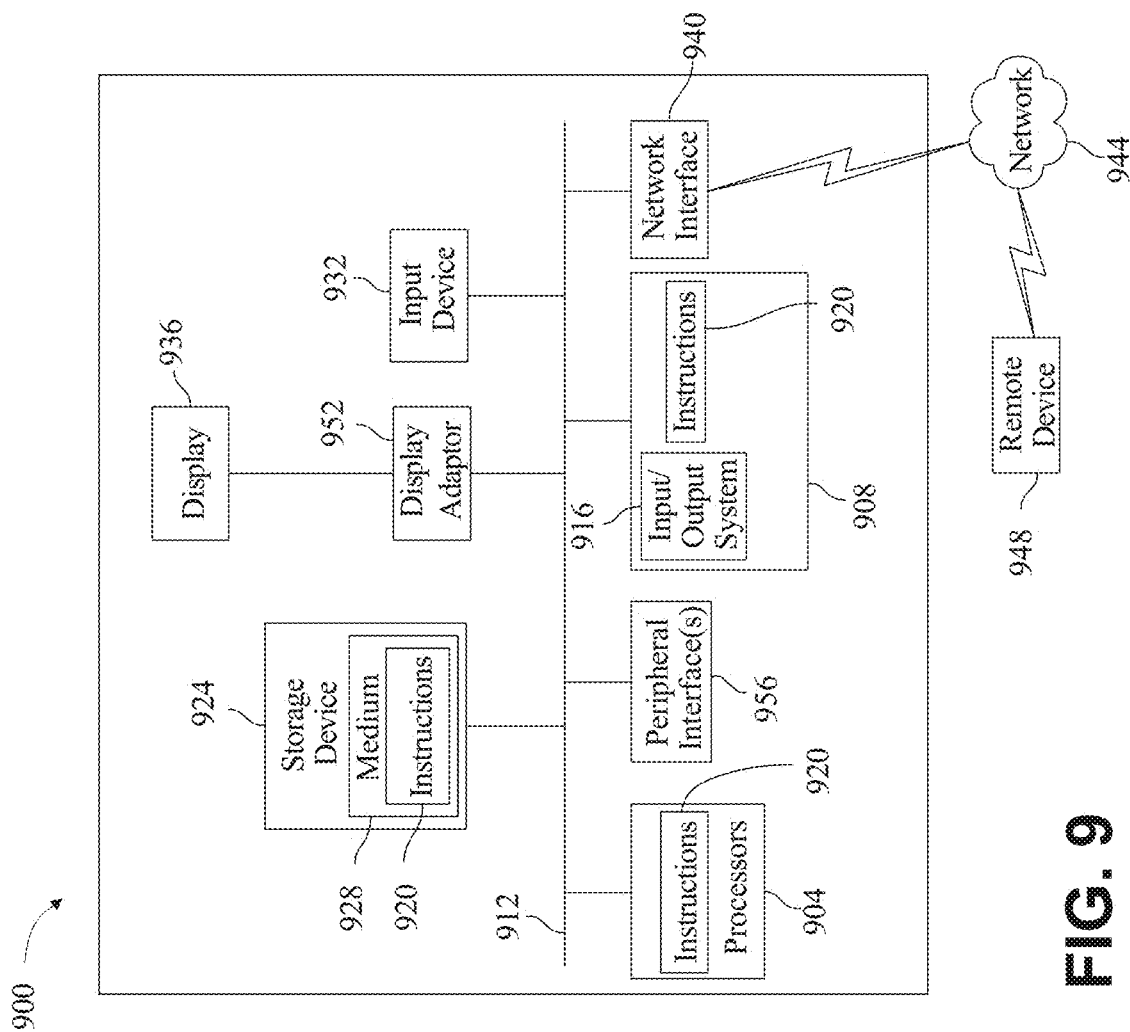
FIG. 9 is a block diagram of an exemplary embodiment of a computing system that can be used to implement any one or more of the methodologies disclosed herein and any one or more portions thereof.

Referring now to FIG. 9, it is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to one of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission. Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein. Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

With continued reference to FIG. 9, the figure shows a diagrammatic representation of one embodiment of a computing device in the exemplary form of a computing system 900 within which a set of instructions for causing the computing system 900 to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computing system 900 may include a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures. Processor 904 may include any suitable processor, such as without limitation a processor incorporating logical circuitry for performing arithmetic and logical operations, such as an arithmetic and logic unit, which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor, field programmable gate array, complex programmable logic device, graphical processing unit, general-purpose graphical processing unit, tensor processing unit, analog or mixed signal processor, trusted platform module, a floating-point unit, and/or system on a chip.

With continued reference to FIG. 9, memory 908 may include various components (e.g., machine-readable media) including, but not limited to, a random-access memory component, a read only component, and any combinations thereof. In one example, a basic input/output system 916, including basic routines that help to transfer information between elements within computing system 900, such as during start-up, may be stored in memory 908. Memory 908 (e.g., stored on one or more machine-readable media) may also include instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

With continued reference to FIG. 9, computing system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, small computer system interface, advanced technology attachment, serial advanced technology attachment, universal serial bus, IEEE 1394 (FIREWIRE), and any combinations thereof. In one example, storage device 924 (or one or more components thereof) may be removably interfaced with computing system 900 (e.g., via an external port connector (not shown)). Particularly, storage device 924 and an associated machine-readable medium 928 may provide nonvolatile and/or volatile storage of machine-readable instructions, data structures, program modules, and/or other data for computing system 900. In one example, software 920 may reside, completely or partially, within machine-readable medium 928. In another example, software 920 may reside, completely or partially, within processor 904.

With continued reference to FIG. 9, computing system 900 may also include an input device 932. In one example, a user of computing system 900 may enter commands and/or other information into computing system 900 via input device 932. Examples of input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

With continued reference to FIG. 9, user may also input commands and/or other information to computing system 900 via storage device 924 (e.g., a removable disk drive, a flash drive, etc.) and/or network interface device 940. A network interface device, such as network interface device 940, may be utilized for connecting computing system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide-area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computing system 900 via network interface device 940.

With continued reference to FIG. 9, computing system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computing system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for performing group computing in a safety-critical operating environment (SCOE), the apparatus comprising:
a primary computing device, wherein the primary computing device comprises:
at least a processor; and
a memory communicatively connected to the at least a processor, wherein the memory contains instructions configuring the at least a processor to: receive task data;
determine a group computing need, wherein determining the group computing need comprises:
comparing the task data against a group computing criterion; and
determining the group computing need as a function of the comparison;
determine a hardware allocation as a function of the group computing need, wherein the hardware allocation includes:
an allocation of at least a first processor core of a plurality of processor cores on a secondary computing device; and
at least an allocation of memory on the secondary computing device;
create a virtual environment using the secondary computing device communicatively connected to the primary computing device, as a function of the hardware allocation, wherein creating the virtual environment further comprises:
partitioning memory of the secondary device according to the at least an allocation of memory; and
partitioning the plurality of processor cores to include the at least a first processor core in the virtual environment;
allocate at least a portion of the task data to the secondary computing device, as a function of the group computing need, wherein the at least a portion of the task data is executed by the secondary computing device; and
receive from the secondary computing device a processing result.

2. The apparatus of claim 1, wherein the at least a processor is further configured to:
receive real-time status data;
adjust the group computing need as a function of the real-time status data; and
modify an allocation of the task data between the primary computing device and the secondary computing device, as a function of the adjusted group computing need.

3. The apparatus of claim 2, wherein modifying the allocation of the task data comprises:
receiving allocation training data comprising a plurality of exemplary allocations as outputs correlated to a plurality of exemplary group computing needs as inputs;
training an allocation machine-learning model as a function of the allocation training data; and
modifying the allocation of the task data as a function of the allocation machine-learning model.

4. The apparatus of claim 1, wherein determining the hardware allocation comprises:
determining a first hardware allocation within the primary computing device;
determining at least a second hardware allocation within the secondary computing device, and
combining the first hardware allocation and the at least a second hardware allocation as the hardware allocation.

5. The apparatus of claim 4, wherein the virtual environment comprises:
a first partition;
at least a second partition; and
at least a hypervisor configured to deploy a static partitioning that isolates the first partition from the at least a second partition.

6. The apparatus of claim 5, wherein the at least a hypervisor is further configured to deploy at least a virtual machine as a function of the static partitioning.

7. The apparatus of claim 5, wherein the at least a processor is further configured to:
receive supplemental task data; and
adjust connections between the first partition and the at least a second partition within the virtual environment as a function of the supplemental task data.

8. The apparatus of claim 5, wherein the task data comprises at least a configuration request that determines an initial allocation of the task data.

9. The apparatus of claim 1, wherein allocating the at least a portion of the task data comprises allocating the at least a portion of the task data using a modified web transfer protocol.

10. The apparatus of claim 1, wherein the at least a processor is further configured to integrate at least a software module into the virtual environment.

11. A method for performing group computing in a safety-critical operating environment (SCOE), the method comprising:
receiving, by at least a processor of a primary computing device, task data;
determining, by the at least a processor, a group computing need, wherein determining the group computing need comprises:
comparing the task data against a preset group computing criterion; and
determining the group computing need as a function of the comparison;
determining, by the at least a processor, a hardware allocation as a function of the group computing need, wherein the hardware allocation includes:
an allocation of at least a first processor core of a plurality of processor cores on a secondary computing device; and
at least an allocation of memory on the secondary computing device;
creating, by the at least a processor, a virtual environment using the secondary computing device communicatively connected to the primary computing device, as a function of the hardware allocation, wherein creating the virtual environment further comprises:
partitioning memory of the secondary device according to the at least an allocation of memory; and
partitioning the plurality of processor cores to include the at least a first processor core in the virtual environment;
allocating, by the at least a processor, at least a portion of the task data to the secondary computing device, as a function of the group computing need, wherein the at least a portion of the task data is executed by the secondary computing device; and
receiving, by the at least a processor from the secondary computing device, a processing result.

12. The method of claim 11, further comprising:
receiving, by the at least a processor, real-time status data;
adjusting, by the at least a processor, the group computing need as a function of the real-time status data; and
modifying, by the at least a processor, an allocation of the task data between the primary computing device and the secondary computing device, as a function of the adjusted group computing need.

13. The method of claim 12, wherein modifying the allocation of the task data comprises:
receiving allocation training data comprising a plurality of exemplary allocations as outputs correlated to a plurality of exemplary group computing needs as inputs;
training an allocation machine-learning model as a function of the allocation training data; and
modifying the allocation of the task data as a function of the allocation machine-learning model.

14. The method of claim 11, wherein determining the hardware allocation comprises:
determining a first hardware allocation within the primary computing device;
determining at least a second hardware allocation within the secondary computing device, and
combining the first hardware allocation and the at least a second hardware allocation as the hardware allocation.

15. The method of claim 14, wherein the virtual environment comprises:
a first partition;
at least a second partition; and
at least a hypervisor configured to deploy a static partitioning that isolates the first partition from the at least a second partition.

16. The method of claim 15, wherein the at least a hypervisor is further configured to deploy at least a virtual machine as a function of the static partitioning.

17. The method of claim 15, further comprising:
receiving, by the at least a processor, supplemental task data; and
adjusting, by the at least a processor, connections between the first partition and the at least a second partition within the virtual environment as a function of the supplemental task data.

18. The method of claim 15, wherein the task data comprises at least a configuration request that determines an initial allocation of the task data.

19. The method of claim 11, wherein allocating the at least a portion of the task data comprises allocating the at least a portion of the task data using a modified web transfer protocol.

20. The method of claim 11, further comprising integrating at least a software module into the virtual environment.

* * * * *